US011789983B2

(12) United States Patent
Durg et al.

(10) Patent No.: US 11,789,983 B2
(45) Date of Patent: Oct. 17, 2023

(54) ENHANCED DATA DRIVEN INTELLIGENT CLOUD ADVISOR SYSTEM

(71) Applicant: Accenture Global Solutions Limited, Dublin (IE)

(72) Inventors: Kishore P. Durg, Bangalore (IN); Raghavan Tinniyam Iyer, Bangalore (IN); Ramkumar Kothandaraman, Bangalore (IN); Ravi Kant Gaur, Bangalore (IN); Sundharraman Karthik Narain, Los Gatos, CA (US); Sudeep Sharma, Bangalore (IN); Puneet Kalra, Pune (IN); Praveen Subbnanjappa, Bangalore (IN); John Francis Walsh, Los Altos Hills, CA (US); Dinesh Jaibhagwan Mittal, Mumbai (IN); Bhavna Butani, Haryana (IN)

(73) Assignee: Accenture Global Solutions Limited, Dublin (IE)

( * ) Notice: Subject to any disclaimer, the term of this patent is extended or adjusted under 35 U.S.C. 154(b) by 24 days.

(21) Appl. No.: 17/472,996

(22) Filed: Sep. 13, 2021

(65) Prior Publication Data
US 2022/0083570 A1 Mar. 17, 2022

(30) Foreign Application Priority Data
Sep. 14, 2020 (IN) .............................. 202011039682

(51) Int. Cl.
*G06F 16/28* (2019.01)
*G06Q 30/0201* (2023.01)
(Continued)

(52) U.S. Cl.
CPC .......... *G06F 16/285* (2019.01); *G06F 16/243* (2019.01); *G06F 16/24578* (2019.01); *G06Q 30/0206* (2013.01)

(58) Field of Classification Search
CPC ................. G06F 16/285; G06F 16/243; G06F 16/24578; G06Q 30/0206
See application file for complete search history.

(56) References Cited

U.S. PATENT DOCUMENTS

| 8,015,217 B2 * | 9/2011 | Challapalli ........... G06F 16/258 707/758 |
| 2001/0014868 A1 * | 8/2001 | Herz .................. G06Q 30/0269 705/26.1 |

(Continued)

*Primary Examiner* — Mark D Featherstone
*Assistant Examiner* — Brooks T Hale
(74) *Attorney, Agent, or Firm* — Fish & Richardson P.C.

(57) ABSTRACT

Methods, systems, and apparatus, including computer programs encoded on computer storage media, for generating a win prediction for an opportunity. In some implementations, a server receives data representing an opportunity. The server obtains historical data from a data repository based on the received data representing the opportunity. The server generates standardized feature vectors based on non-standardized data, the non-standardized data comprising (i) the received data and (ii) the obtained historical data. The server filters the standardized feature vectors. The server generates a win percentage based on the filtered feature vectors using classifiers. In response to generating the win percentage for the opportunity, the server generates a plurality of data insights using the classifiers and the generated win percentage, wherein the plurality of data insights describe one or more data predictions for pursuing the opportunity. The server provides the win percentage and the plurality of data insights for output.

18 Claims, 7 Drawing Sheets

(51) Int. Cl.
    *G06F 16/242*     (2019.01)
    *G06F 16/2457*     (2019.01)

(56) References Cited

U.S. PATENT DOCUMENTS

| | | | | |
|---|---|---|---|---|
| 2007/0276806 | A1* | 11/2007 | Tan | G06V 30/18019 |
| | | | | 707/E17.02 |
| 2019/0347428 | A1* | 11/2019 | Youssefi | G06F 21/602 |
| 2020/0050964 | A1* | 2/2020 | Vassilev | G06F 17/16 |
| 2021/0286954 | A1* | 9/2021 | Ng | G06F 40/30 |

\* cited by examiner

PLATFORM SCREENSHOTS – ROM BUSINESS CASE accenture | BUSINESS CASE ANALYZER | Welcome anikita.kaushal

BUSINESS CASE – BP ROM VERSION 1.0

| OPPORTUNITY PROFILE | EFFORT ESTIMATOR | DASHBOARD | H2 INITIATIVE | CONSOLIDATED ACC P&L | CLIENT BUSINESS CASE | MIGRATION SCREENS ▼ |

What-if Scenario: [Select ▼]
Can't create what if scenario as either it is not latest baselined version or there is a wip version

ACCENTURE MANAGEMENT & CORPORATE VIEW [H1]

| In $M's | FY 19 | FY 20 | FY 21 | FY 22 | FY 23 | FY 24 | FY 25 | FY 26 | FY 27 | FY 28 | TOTAL |
|---|---|---|---|---|---|---|---|---|---|---|---|
| TOTAL REVENUES | 6.3 | 42.9 | 67.8 | 67.8 | 67.8 | 56.5 | 0.0 | 0.0 | 0.0 | 0.0 | 309.0 ⌄ |
| COST OF SERVICES | 3.9 | 26.6 | 42.4 | 42.4 | 42.4 | 35.3 | 0.0 | 0.0 | 0.0 | 0.0 | 192.9 ⌄ |
| CCI % | 38.2% | 38.0% | 37.5% | 37.5% | 37.5% | 37.5% | • | • | • | • | 37.6% ⌄ |
| OI % | (50.8)% | 23.3% | 25.0% | 25.0% | 25.0% | 25.0% | • | • | • | • | 23.2% ⌄ |

ACCENTURE MANAGEMENT & CORPORATE VIEW [H1 + H2]

| In $M's | FY 19 | FY 20 | FY 21 | FY 22 | FY 23 | FY 24 | FY 25 | FY 26 | FY 27 | FY 28 | TOTAL |
|---|---|---|---|---|---|---|---|---|---|---|---|
| TOTAL REVENUES | 6.3 | 44.4 | 77.4 | 48.6 | 72.6 | 58.1 | 1.4 | 0.0 | 0.0 | 0.0 | 33.87 ⌄ |
| TOTAL COST | 3.9 | 27.4 | 47.7 | 48.4 | 45.1 | 36.2 | 0.8 | 0.0 | 0.0 | 0.0 | 209.4 ⌄ |
| CCI % | 38.2% | 38.3% | 38.4% | 38.4% | 37.9% | 37.7% | 44.1% | • | • | • | 38.2% ⌄ |

FIG. 3A

PLATFORM SCREENSHOTS – ROM BUSINESS CASE

BUSINESS CASE – BUSINESS CASE – 24 JUL VERSION 0.0

| OPPORTUNITY PROFILE | EFFORT ESTIMATOR | DASHBOARD | H2 INITIATIVE | CONSOLIDATED ACC P&L | CLIENT BUSINESS CASE | MIGRATION SCREENS ▼ |

*All values are in ($M)

| Client Fiscal Year | Year 1 | Year 2 | Year 3 | Year 4 | Year 5 | Year 6 | Year 7 | Year 8 | Year 9 | Year 10 | TOTAL | |
|---|---|---|---|---|---|---|---|---|---|---|---|---|
| IT SPEND | 720.0 | 720.0 | 720.0 | 720.0 | 720.0 | . | . | . | . | . | 3600.0 | > |
| IT SPEND AS-IS (Baseline) | 482.4 | 482.4 | 482.4 | 482.4 | 482.4 | . | . | . | . | . | 2412.0 | > |
| Horizontal1 TO-BE (Total Future State Cost) 525.7 | 147.0 | 60.8 | 60.8 | 52.0 | . | . | . | . | . | 846.1 | > | |
| Horizontal 1 Savings | (43.3) | 335.4 | 421.6 | 421.6 | 430.4 | . | . | . | . | . | 1565.9 | |
| Horizontal 1 Savings % | (9.0)% | 69.5% | 87.4% | 87.4% | 89.2% | 0.0% | 0.0% | 0.0% | 0.0% | 0.0% | 64.9% | |
| Horizontal 2 (Net Benefits) | | 0.2 | 0.3 | 0.2 | 0.1 | 0.0 | . | . | . | 0.0 | 0.8% | > |
| (Horizontal 1) + Horizontal 2) Savings | (43.3) | 335.4 | 422.0 | 421.9 | 430.5 | . | . | . | . | 0.0 | 1566.7 | |

FIG. 3B

ENHANCED DATA DRIVEN INTELLIGENT CLOUD ADVISOR SYSTEM

CROSS-REFERENCE TO RELATED APPLICATION

This application claims the benefit of Indian Patent Application No. 202011039682 filed Sep. 14, 2020, which is incorporated herein by reference.

TECHNICAL FIELD

This specification generally relates to computer predictions, and one particular implementation relates to generating a win prediction for an opportunity using a tool that includes an interconnected set of machine learning-trained classifiers.

BACKGROUND

Currently, no single tool exists to intelligently support organizations as they transit a sales journey, from onboarding an opportunity through generating a pitch. A sales journey can take organizations through developing and providing a pitch for proposal to be won for one or more prospective clients. As such, when important business decisions arise in connection with the sales journey, it is common for decisions to be made without the use of all the relevant facts, and to be driven based on emotion instead of facts or logic.

SUMMARY

The techniques in this specification describe generating a proposal using data associated with an opportunity. In particular, a data driven intelligent cloud advisor can access the data associated with the opportunity to generate the proposal. In some implementations, the data driven intelligent cloud advisor can generate the proposal for the opportunity by analyzing input data provided by a user and historical data previously analyzed for prior opportunities. The opportunity can be related to a line of business that attempts to persuade a potential client or clients for purchasing a product or service sold by the user or the user's corporation. The data driven intelligent cloud advisor can generate a proposal that helps the user to initiate and close a sale of the product or service, for example, for the potential client or clients. Typically, various competitors may also be competing for winning the same opportunity over the user. However, with the aggregation of data and intelligence performed by the data driven intelligent cloud advisor on the aggregated data at his/her disposal, the user's chances of winning the opportunity significantly increases over the competitors.

The data driven intelligent advisor can obtain a vast amount of input and historical data regarding the opportunity and extract relevant information from the data to identify and generate a proposal to be provided to the intended audience, e.g., the prospective client(s). The generation of the proposal can maximize the user's chance to win the opportunity. For example, the data driven intelligent cloud advisor can centralize insights and information regarding the opportunity from various external sources, leverage global knowledge assets regarding the opportunity, instantaneously connect sales personnel to cloud experts for retrieving proper data, e.g., documents, sales numbers, business relationships, and others, for the opportunity, and gain awareness of competitors' strengths and weaknesses who are also pursing the opportunity. In response to aggregating the relevant data, the data driven intelligent cloud advisor can generate a business case, credentials, and ultimately, a proposal through minimal interactions by the user in a short turn-around time using the aggregated data.

In some implementations, the data driven intelligent cloud advisor initiates generating the proposal based on input data. In particular, the data driven intelligent cloud advisor can receive one or more user inputs that reference an opportunity, and obtain data from a data repository based on the one or more user inputs. The one or more user inputs can include, for example, web data associated with the opportunity, email and/or email attachments associated with the opportunity, and other digital documents associated with the opportunity. The data driven intelligent cloud advisor can then process the received data using a set of interconnected classifiers that have been trained to produce one or more insights regarding the user's pursuit of the opportunity. In response, the data driven intelligent cloud advisor can provide the one or more generated insights regarding the opportunity as a proposal for the user.

In some implementations, the data driven intelligent cloud advisor can include multiple interconnected classifiers. For example, the multiple interconnected classifiers can include a price range indicator engine, a dynamic weightage engine, a win predictor engine, an intelligent action engine, a dynamic ranking engine, an intelligent business case engine, an intelligent proposal response engine, and an intelligent competition battlecard engine. Each of these engines and their corresponding connection/relationship to the other engines will be further described below. The multiple interconnected classifiers can work in a parallel and/or in a serial manner to generate data outputs or insights regarding the opportunity to provide to the user. For example, the data outputs can include a predicted win percentage for the proposal, competition price range and a recommended list of actions to take for improving the win percentage, a battlecard that describes areas to strengthen, a ROM business case, an auto generated proposal, and a list of similar opportunities to connect and enhance the proposal.

In some implementations, the data driven intelligent cloud advisor can be a data centric system relying on multiple data and input components. For example, the data driven intelligent cloud advisor can use continuous and real time data ingestion from multiple internal and external sources, whether the data is unstructured, semi-structured, and/or fully structured data. The data driven intelligent cloud advisor can rely on the intelligent, data-driven machine learning algorithms for prediction and recommendation for initiating and closing the sales pitch.

Each of the machine learning models within the engines or classifiers can continuously learn using an unsupervised analysis, one or more closed-loop learning mechanisms, and NLP-based sentiment analysis, for example. The data driven intelligent cloud advisor can further employ dynamic ranking and classification of data based on inputs provided by the user, the inputs being aligned with the opportunity. In some examples, the data driven intelligent cloud advisor can be a human-centric operator, using a conversational agent-driven user interface. In other examples, the data driven intelligent cloud advisor can operate in an autonomous fashion without user input to minimize the interactions with a user. Moreover, the data driven intelligent cloud advisor can provide real-time decision-making capabilities to personalize actions and recommendations for enhancing the user's chance to pursue and successfully win the opportunity.

The techniques described in this specification describe that data from a plurality of resources is obtained by a server in a non-standardized format. The non-standardized data can include digital documents, financial transactions, emails, and other external document data related to an opportunity, for example. The server can convert the non-standardized data into a standardized format, e.g., feature vectors, for processing of the feature vectors to generate proposals which can be output and shared to other users.

Specifically, these elements recite a specific improvement that allow for users to access proposals and other insights generated from standardized data, e.g., feature vectors, using a set of machine-learning trained classifiers regardless of the format of the non-standardized data, e.g., data from the plurality of resources. For example, the specific improvement may generate a proposal from using standardized feature vectors as inputs into a set of machine-learning trained classifiers regardless of the format of the digital documents, emails, etc. used to generate the standardized feature vectors.

If the system did not convert the non-standardized data into standardized data before processing to generate proposals, the system would not be able to ascertain the relevant information in the non-standardized data used to generate competitive proposals. By converting the non-standardized data into standardized data, the system can filter out unnecessary and not relevant information for generating competitive proposals.

In one general aspect, a method is performed by a server. The method includes: receiving, by a server, data representing an opportunity from a plurality of data sources; obtaining, by the server, historical data from a data repository based on the received data representing the opportunity; generating, by the server, standardized feature vectors based on non-standardized data, the non-standardized data comprising (i) the received data and (ii) the obtained historical data; filtering, by the server, the standardized feature vectors based on characteristics describing (i) the opportunity, (ii) the received data, and (iii) the obtained historical data; generating, by the server, a win percentage for the opportunity based on the filtered feature vectors using a set of trained interconnected classifiers; in response to generating the win percentage for the opportunity, generating, by the server, a plurality of data insights using the set of trained interconnected classifiers and the generated win percentage, wherein the plurality of data insights describe one or more data predictions for pursuing the opportunity; and providing, by the server, the win percentage and the plurality of data insights regarding the opportunity for output.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes wherein receiving the data representing the opportunity from the plurality of data sources further comprises: receiving, by the server, the data describing a sales pitch for the opportunity from the plurality of data sources, the plurality of data sources storing at least one of: (i) web documents, (ii) emails, (iii) financial transactions, (iv) mobile communications, (v) digital documents, and (vi) client data associated with the opportunity.

In some implementations, the method includes wherein obtaining the historical data from the data repository based on the received data further comprises: identifying, by the server, the client data that the opportunity references; and retrieving, by the server, historical data using the identified client data from the data repository, wherein the data repository stores at least one of: (i) financial data associated with a plurality of clients, (ii) digital documents associated with the plurality of clients, and (iii) previous predictions generated by the server associated with the plurality of clients for other opportunities.

In some implementations, the method includes wherein generating the standardized feature vectors based on the non-standardized data further comprises: tokenizing, by the server, the non-standardized data that comprises the received and the obtained historical data to identify multiple tokens, wherein the multiple tokens correspond to feature vectors in an N-dimensional data set.

In some implementations, the method includes wherein filtering the standardized feature vectors further comprises: filtering, by the server, the multiple tokens based on a set of predefined categories, wherein filtering the multiple tokens (i) reduces a dimensionality of the N-dimensional data set and (i) associates the tokens from the multiple tokens with one or more of the categories from the set of predefined categories.

In some implementations, the method includes wherein generating the win percentage for the opportunity based on the received data and the historical data using the set of trained interconnected classifiers further comprises: generating, by a win prediction classifier of the server, the win percentage for the opportunity based on the filtered data and one or more machine learning algorithms that trained the win prediction classifier.

In some implementations, the method includes generating, by a competition price range prediction classifier of the server, a competition price range that describes competitors prices for the opportunity based on the received data, the historical data, and one or more machine learning algorithms that trained the competition price range prediction classifier.

In some implementations, the method includes wherein generating the plurality of data insights using the set of trained interconnected classifiers and the generated win percentage further comprises: generating, by an intelligent action engine of the server, a plurality of actions to be taken by a client for pursuing the opportunity based on the generated win percentage and the generated competition price range; generating, by an intelligent proposal response generator of the server, one or more options for inclusion in a proposal response associated with the opportunity to provide to a client; generating, by an intelligent competition battlecard engine of the server, data representing a strategy for addressing strengths and weaknesses associated with the proposal response; generating, by an intelligent business case engine of the server, data representing a business case for pursuing the opportunity, wherein the data representing the business case comprises (i) cost data, (ii) return on investment (ROI) data, (iii) investment data, and (iv) data for expansion of clientele business; generating, by a dynamic weightage engine of the server, one or more weights associated with each category of data from the received data and the historical data; and generating, by a dynamic ranking engine of the server, ranked actions associated with the plurality of actions based on the generated one or more weights for the opportunity.

In some implementations, the method includes wherein providing the win percentage and the plurality of data insights regarding the opportunity for output comprises: providing, by the server, the win percentage and the plurality of data insights regarding the opportunity for output to a client device associated with a user seeking to pursue the opportunity, wherein the plurality of data comprises the plurality of actions, the one or more options for inclusion in the proposal, the data representing the strategy for addressing the strengths and weaknesses associated with the proposal response, the data representing the business case, the one or more weights associated with each category of data, and the ranked data.

In some implementations, the method includes receiving, by the server, feedback data that describes corrections to the one or more data predictions for pursing the opportunity; and updating, by the server, the set of trained interconnected classifiers based on the received feedback data.

In some implementations, the method includes generating, by the server, a model that comprises the set of trained interconnected classifiers; and providing, by the server, the generated model for output as a web service.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a user interface that illustrates an example of a business case.

FIG. 3B is another user interface that illustrates an example of a business case.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1A:
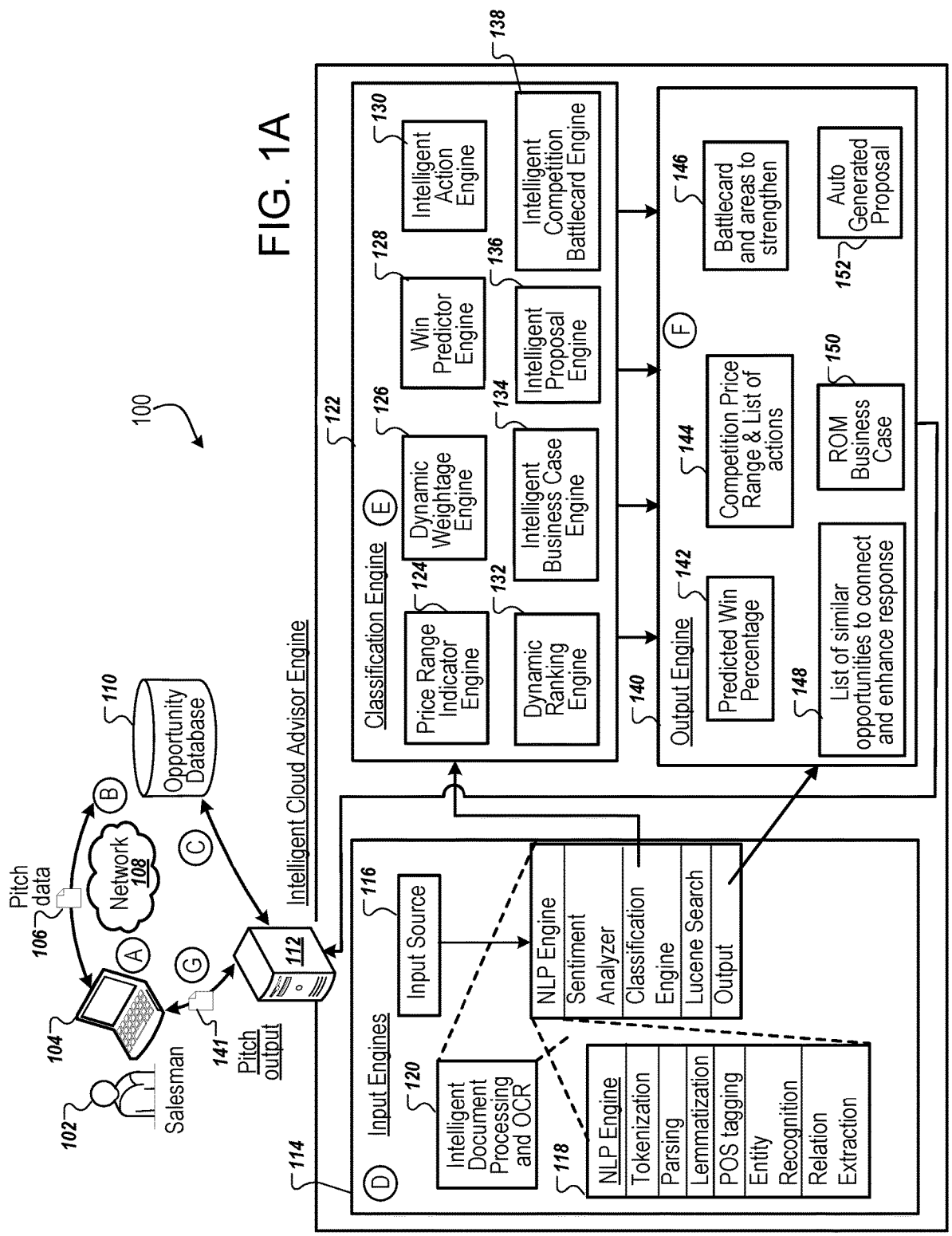
FIG. 1A is a block diagram that illustrates an example of a system for generating a proposal for an opportunity using an intelligent advisor engine.

FIG. 1A is a block diagram that illustrates an example of a system 100 for generating a proposal for an opportunity using an intelligent advisor engine. The system 100 includes an intelligent cloud advisor engine 112, an opportunity database 110, a client device 104, and a network 108. The system 100 can also include one or more other databases that the intelligent cloud advisor engine 112 can access and retrieve data. Briefly, the system 100 can generate a proposal for a user using data associated with an opportunity. The system 100 can generate insights regarding the opportunity using multiple interconnected classifiers or engines and aggregate the insights into an automatically generated proposal for the user to pursue the opportunity.

The opportunity can correspond to a line of business that a user attempts to persuade a potential client, clients, or one or more businesses for purchasing a product of service. The intelligent cloud advisor engine 112 can generate the proposal that helps the user, e.g., user 102, to initiate and close a sale of the product or service associated with the opportunity for winning the opportunity. For example, as illustrated in system 100, user 102 can be a sales clerk or other business individual seeking to win an opportunity. The opportunity can be associated with an external client or company and can be related to a particular subject for the product or service.

In some implementations, the client device 104 can correspond to a device associated with user 102. The client device 104 can be, for example, a personal computer, a handheld device, a server, a mobile phone, a tablet, or some other device. The client device 104 can communicate with the intelligent cloud advisor engine 112 over a network 108. User 102 may access an application on the client device 104 that directly communicates with the intelligent cloud advisor engine 112 and its corresponding components. In this case, user 102 can be at a different geographic location from the intelligent cloud advisor engine 112 and still be able to communicate with the intelligent cloud advisor engine 112 using their client device 104 over the network 108.

In some cases, user 102 may be able to interact with the intelligent cloud advisor engine 112 without the use of client device 104. For example, system 100 may include a terminal or display connected to the intelligent cloud advisor engine 112 that enables user 102 to interact with the intelligent cloud via keyboard, mouse, touch-screen display, verbal commands, or some other form of interaction. The user 102 can then bypass communicating with the intelligent cloud advisor engine 112 over the network 108 and instead, directly interact with and receive feedback locally from the intelligent cloud advisor engine 112.

The network 108 can be any communication network that enables client device 104 and the intelligent cloud advisor engine 112 to communicate. For example, the network 108 can include a Bluetooth network, a Wi-Fi network, an Ethernet Network, a ZigBee network, an Internet connection, or some other form of wireless or wired connection. The network 108 can also include one or more of these different communication networks. For example, the network 108 can enable the client device 104 to communicate with both the opportunity database 110 and the intelligent cloud advisor engine 112. Similarly, the intelligent cloud advisor engine 112 can communicate with the opportunity database 110 and the client device 104 over the network 108. For example, the client device 104 can communicate with the opportunity database 110 and the intelligent cloud advisor engine 112 over the Internet and the intelligent cloud advisor engine 112 can communicate with the opportunity database 110 over an Ethernet connection. Other examples are also possible.

In some implementations, the intelligent cloud advisor engine 112 may include one or more servers or computers connected locally or over a network. As mentioned, the intelligent cloud advisor engine 112 can communicate, e.g., transmit and receive, with various databases, e.g., opportunity database 110, and various computers. FIG. 1A illustrates various operations in stages (A) through (G) which can be performed in the sequence indicated or another sequence.

The intelligent cloud advisor engine 112 may communicate with the opportunity database 110 to retrieve one or more documents associated with various data types. The opportunity database 110 may include one or more databases that store various data. For example, these databases can include multiple databases, data stores, a cloud network, data tables, or some other data storage type. The opportunity database 110 can store data related to, for example, industry benchmarks, industry standards, analysts' reports, deal documents, prior proposals, and data regarding competition amongst competitors. The opportunity database 110 can also store credentials of users, e.g., username/emails and passwords, which access the intelligent cloud advisor engine 112, historical win-loss data generated by the intelligent cloud advisor engine 112, user feedback, blogs, industry trends, mobile communications, past deal data, research data, and client feedback, to name a few examples.

The opportunity database 110 can store the data in various formats. For example, the data may be stored in digital documents, emails, email attachments, web application data, transactional data, personal client documents, transactional receipts, and financial documents. Additionally, when the intelligent cloud advisor engine 112 generates insights and a proposal for an opportunity provided by user 102, the intelligent cloud advisor engine 112 can store the insights and the generated proposal in the opportunity database 110 for retrieval at a later point in time. Moreover, the opportunity database 110 can store data in both a structured or unstructured format, and include data that may be useful to the intelligent cloud advisor engine 112 when generating insights. These structured or unstructured data types can include stored, existing documents, or dynamically created documents, and may include documents that can be accessed on the Internet, to name a few examples.

As mentioned the intelligent cloud advisor engine 112 can include one or more computers connected locally or over a network. The intelligent cloud advisor engine 112 can include intelligent document processing components, one or more natural language processing (NLP) components, one or more application programmable interfaces (APIs) for accessing different components within the intelligent cloud advisor engine 112, intelligent engines for producing insights regarding the opportunity, and output modules. Each of these components will be further described below.

The intelligent cloud advisor engine 112 can communicate with the client device 104 and/or the opportunity database 110 to obtain data regarding the opportunity, providing insights as output, or accessing data associated with the opportunity. Moreover, the intelligent cloud advisor engine 112 can communicate with the client device 104 for login and authentication purposes in addition to accessing data associated with the opportunity.

During stage (A), the user 102 provides a query to the client device 104. The query can correspond to a request for the intelligent cloud advisor engine 112 to generate a proposal and other data for a particular opportunity. The particular opportunity can correspond to a sales opportunity that user 102 desires to pursue. The user 102 may correspond to a businessperson at a company, e.g., a sales representative, sales clerk, CEO, CFO, technical writer, or other, who seeks information regarding a proposal. For example, the user 102 may be seeking how to win a contract associated with a potential buyer for a product or service sold by a company that employs user 102. The user 102 may seek advice on how to win a contract associated with "Company X" for IT service consulting that is sold by "Company Y" that employs user 102, for example. However, in this example, "Company A," "Company B," and "Company C" also are competing for the same contract with "Company X." The user 102, in this example, can provide information regarding the opportunity to the client device 104 to aid the intelligent cloud advisor engine 112's generation of insights on how to optimize potential for "Company Y" to win the IT consulting contract over "Companies A, B, and C."

In some implementations, the user 102 can provide information that describes the opportunity to the intelligent cloud advisor engine 112. Information that describes the opportunity can include, for example, data that describes the opportunity, data that describes other competitors seeking the same opportunity, data describing the company that is being approached for the opportunity, e.g., their name, prior history, such as opportunities and deals, associated with both the competitors and the company being approached for the opportunity. The user 102 can provide this information in the form of, for example, web sites, transactional data, historical financial data, emails between user 102 and the company being approached, emails between user 102 and competitors for this opportunity, as well as attachments from those emails, to name a few examples. Generally, the intelligent cloud advisor engine 112 can accept any type of digital data, e.g., documentation, images, video, or audio data, associated with the opportunity that aid's the intelligent cloud advisor engine 112's determination of the insights.

In some examples, the request can include a textual description of the opportunity. The textual description of the opportunity can describe a client or potential client the user 102 is pursuing, the product or service seeking to be bought by the client or potential client, and information regarding a relationship between the user 102 and the client or potential client. The request can also include a formal application that includes a template for describing the opportunity. The template can include one or more fields that the user 102 can enter information to describe the opportunity. With the template, the engines associated with the intelligent cloud advisor engine 112 can easily determine an intent and data associated with the opportunity.

The user 102 can also provide information that characterizes themselves to the intelligent cloud advisor engine 112. The characterizing information can include, for example, login credentials, e.g., username and password, for authenticating user 102 with an application on the client device 104 associated with the intelligent cloud advisor engine 112 and/or authenticating user 102 with the intelligent cloud advisor engine 112, a job title of user 102 at a particular company, data that indicates prior opportunities pursued by user 102 with the assistance of the intelligent cloud advisor engine 112, and data that identifies user 102's relationship with the opportunity. For example, user 102 can be a salesperson, can indicate that they have also pursued prior opportunities with a similar company/client they are currently pursuing now for a different opportunity, user 102's success or win rates associated with the prior opportunities, and data indicating user 102 is friends with an individual associated with the potential opportunity at Company Y. The intelligent cloud advisor engine 112 can determine that this friendship may provide a competitive advantage over user 102's competitors. The user 102 can also provide other information regarding the opportunity, prior opportunities, or information on user 102 to the client device 104, the opportunity database 110, and/or the intelligent cloud advisor engine 112.

During stage (B), the client device 104 can transmit the data entered by the user 102 regarding the opportunity over network 108 to the opportunity database 110. In some examples, the client device 104 can transmit the data entered by the user 102 to the opportunity database 110 and transmit a notification to the intelligent cloud advisor engine 112 to indicate data regarding a new opportunity has been provided to the opportunity database 110. In this example, the opportunity database 110 can indicate to the intelligent cloud advisor engine 112 a location where the received data from the client device 104 was stored for accessing at a later point in time.

In other examples, the client device 104 can transmit the data entered by the user 102 directly to the intelligent cloud advisor engine 112. In these examples, after the intelligent cloud advisor engine 112 has generated insights regarding the opportunity, the intelligent cloud advisor engine 112 can store the generated insights and the corresponding data entered by the user 102 during stage (A) in the opportunity database 110. Moreover, the user 102 can directly provide the data to the intelligent cloud advisor engine 112 without the use of a client device 104.

During stage (C), the intelligent cloud advisor engine 112 can receive the data from the opportunity database 110 and/or from the client device 104. The data obtained from the opportunity database 110 and from the client device 104 can be referred to as the non-standardized data. In some implementations, the intelligent cloud advisor engine 112 can recognize and determine that the data provided by the user 102 from the client device 104 corresponds to a request from user 102 to generate insights regarding a particular opportunity. For example, the intelligent cloud advisor engine 112 can first authorize the user 102's access by comparing stored credentials to credentials provided in the query. If the intelligent cloud advisor engine 112 determines that a match does not exist, the intelligent cloud advisor engine 102 has a few options regarding proceeding. In one example, the intelligent cloud advisor engine 112 can deny the user 102 access to the intelligent cloud advisor engine 112. In another example, the intelligent cloud advisor engine 112 can deny the user 102 access and recommend the user 102 generate new credentials for authentication purposes. In another example, if the provided credentials match the stored credentials, then the intelligent cloud advisor engine 112 can authenticate the user 102's access.

If the intelligent cloud advisor engine 112 authenticates the user 102's access, then the intelligent cloud advisor engine 112 can proceed to generating insights regarding the opportunity provided by the user 102. The intelligent cloud advisor engine 112 can include input engines 114 and classification engines 122 for processing the data provided in the query and output engine 140 for providing the generated insights to user 102. The input engines 114 can include intelligent document processing and optical character recognition (OCR) 120 and NLP engine 118 functions. The classification engines 122 can include a price range indicator engine 124, a dynamic weightage engine 126, a win predictor engine 128, an intelligent action engine 130, a dynamic ranking engine 132, an intelligent business case engine 134, an intelligent proposal engine 136, and an intelligent competition battlecard engine 138. Each of these engines and their corresponding functions will be further described below.

In some implementations, the input engines 114 can include input source 116. The input source 116 can include the data received from the user 102 regarding the opportunity and data retrieved from the opportunity database 110. The intelligent cloud advisor engine 112 can process the input source 116 using one or more functions from the intelligent document processing and OCR 120. These functions can include intelligent document processing, OCR, image recognition, and other functions. For example, the intelligent document processing and OCR 120 can transform data that is unstructured and/or semi-structured data into data that is usable and understandable. The intelligent document processing and OCR 120 can use artificial intelligence, such as, natural language processing (NLP), computer vision, and other deep learning algorithms to extract relevant information or from the usable documents, classify the documents into a classification type, and categorize the classified documents. Specifically, the intelligent document processing and OCR 120 can include an NLP engine, a sentiment analyzer, a classification, a weightage engine, ranking, recommendation, Lucene search, and output.

The NLP engine can include one or more functions for processing the input source 116. For example, the one or more functions of the NLP engine can include tokenization, parsing, lemmatization, POS tagging, entity recognition, and relation extraction. The NLP engine can recognize or identify the contextual meanings of each of the words or phrases provided in the query. The NLP module can use its functions to extract terms from external documents or sources, such as financial data, the formal application template, emails, web documents, and other online resources. In some implementations, the NLP module can include one or more machine learning algorithms that are trained using deep learning algorithms, for example.

In some implementations, the NLP engine initiates processing of the input source 116 with tokenization. Tokenization is processing by which a large sample of text is split into one or more tokens. The NLP engine can split the one or more tokens based on particular delimiters. These delimiters can include, for examples, spaces, commas, semicolons, letters, and other user defined delimiters. The tokens then are provided to parsing, where the parsing receives a stream of tokens as input and based on rules, can generate a parse tree data structure, for example. The parse tree data structure can correspond to an ordered, rooted tree that represents the syntactic structure of a string according to grammatical rules. The parsed tress can be based on nouns, verbs, sentences, and other word or sentence identifiers. The NLP engine can then perform lemmatization on the parsed tree. Lemmatization can refer to the process of grouping together inflected forms of word, e.g., the word "walk" and inflected words "walked, walks, walking", with the root word so that the words can be analyzed as a single item. In this manner, the words in the parsed tree can be reduced to their corresponding single item or lemma to reduce the overall complexity of processing data from the input source 116.

After the NLP engine executes lemmatization, the NLP engine can perform part of speech (POS) tagging. POS tagging can correspond to categorizing words in the text based on their part of speech, depending on the definition of the word and the word's context. The part of speech tagging can describe the characteristic structure of lexical terms within a sentence or text, which ultimately, allows the input engine 114 and the classification engines 122 to make assumptions about the semantics of the data from the input source 116. For example, the words "Dog ran fast" can be tokenized into "Dog," "ran," and "fast." The lexical terms of these words can be noun for "Dog," verb for "ran" and adjective for "fast." The POS tagging can be NN for "Dog" to indicate noun, VB for "ran" to indicate verb, and ADJ for "fast" to indicate adjective.

After POS tagging, the NLP engine can perform entity recognition. Entity recognition can correspond to the process by which the NLP engine 118 can identify and classify named entities into various classes. The entity recognition can use one or more statistical or machine learning models to identify one or more identified entities into classes. The entity recognition portion of the NLP engine 118 can improve its understanding and classification of terms into classes based on training data. Thus, the more varieties and data types introduced to the NLP engine 118 during training, the more words the entity recognition can recognize and classify.

In some implementations, the NLP engine 118 can also perform relation extraction. The relation extraction can correspond to the NLP engine 118 extracting semantic relationships from the entities determined during the entity recognition. These semantic relationships can be used to train the AI models of the NLP engine 118, aiding in understanding of relationships between the entities, and in determining contextual meanings of the words.

After the NLP engine 118 processes the input source 116, the output of the NLP engine 118 is provided to the sentiment analyzer. In some implementations, the sentiment analyzer can determine whether data is positive, negative, or neutral. For example, the sentiment analyzer can use the data provided by the NLP engine 118 and the input source 116 to determine whether the data is helpful towards pursuit of the opportunity, not helpful towards pursuit of the opportunity, or neutral towards the opportunity. The sentiment analyzer can indicate the positive, negative, or neutral connotation for each word or data point output by the NLP engine 118. In some examples, the sentiment analyzer can identify feelings of emotions, intentions, urgency, and on polarity, e.g., positive, negative, or neutral. This information can be used to help the engines within the classification engines 122 to produce their corresponding predictions. For example, the sentiment analyzer can provide sentiment of user feedback. The sentiment analyzer can use external cognitive services, text analytics API, and other natural language API. In particular, the sentiment analyzer is a part of the NLP engine 118 that seeks to identify and extract opinions from a given text.

In some implementations, the NLP engine can perform feature hashing on the output text from the sentiment analyzer. The feature hashing can correspond the NLP engine transforming the series of text into feature vectors represented as integers. These feature vectors can correspond to standardized data or standardized feature vectors used for processing by the NLP engine in generating the proposal by the classifier engines 122. For example, the NLP engine can take the output text from the non-standardized data and perform feature hashing to generate the standardized data. The NLP engine converts the non-standardized data to the standardized feature vectors for the set of classifiers in the classification engine 122 to generate the automated proposal and the plurality of insights. Without the standardized feature vectors, the set of classifiers in the classification engine 122 would not be able to generate the automated proposal and the plurality of insights from the non-standardized data. These integers or feature vectors can represent the relevant information extracted and transformed by the NLP engine 118. These integers or feature vectors can correspond to values that can be mapped into dimensional data sets, where the dimensional data sets can range from a single dimension to N dimensions, e.g., 128 dimensional space, for example. These feature vectors can then be provided to the classification engine 122 for processing and generating of insights for the opportunity. The feature vectors may be filtered using processes such as, principal component analysis and linear discriminant analysis, before being provided to the classification engine 122. This process will be further explained with respect to FIGS. 2A and 2B below.

During stage (E), the output of the sentiment analyzer, e.g., feature vectors, can be provided to the classification engine 122. Generally, the classification engine 122 can include a set of interconnected classifiers that can predict and generate insights regarding the opportunity provided by the user 102. Specifically, the classification engines 122 can generate a win prediction and a competition price range for the opportunity by leveraging historical data and data provided by user 102. For example, the classification engines 122 can include a price range indicator engine 124, a dynamic weightage engine 126, a win predictor engine 128, an intelligent action engine 130, a dynamic ranking engine 132, an intelligent business case engine 134, an intelligent proposal engine 136, and an intelligent competition battlecard engine 138.

The price range indicator engine 124 can estimate a competition price range based on user inputs and historical data. The price range indicator engine 124 can use a variety of machine learning models, content based filtering, collaborative filtering, and hybrid content-collaborative based filtering. The price range indicator engine 124 can take in input from the input source 116, the NLP engine 118, and the sentiment analyzer and output price ranges associated with competitors of user 102 for the destined opportunity.

The dynamic weightage engine 126 can generate custom weights associated with each data category provided by the input source 116, the NLP engine 118, and the sentiment analyzer. In particular, the dynamic weightage engine 126 can compute or determine weightages based on user inputs/historical data using one or more machine learning algorithms and predict maximum likelihood results for user 102. The dynamic weightage engine 126 can assign weights dynamically based on, for example, a cloud platform, a workload of the intelligent cloud advisor engine 112, a current market associated with the opportunity, one or more competitors also pursuing the opportunity, a client cloud journey phase, a business objective associated with the user 102, a size of the financial deal associated with the opportunity.

The win predictor engine 128 can generate a percentage that describes the user 102's chances of winning the opportunity. The win predictor engine 128 can generate the win percentage based on user inputs and historical data using one or more machine learning models. For example, the win predictor engine 128 can use a variety of machine learning models, content based filtering, collaborative filtering, and hybrid content-collaborative based filtering. The output of the win predictor engine 128 can be a statistical value, a percentage, or another data point that describes the user 102's chances of winning the opportunity.

The intelligent action engine 130 can generate a set of action items for user 102 to take for pursuing the opportunity. The intelligent action engine 130 can generate the set of action items for the user 102 based on the win prediction percentage and the competition price range output by the win predictor engine 128 and the price range indicator engine 124, respectively. The action items generated by the intelligent action engine 130 can be initially preconfigured and later, the intelligent action engine 130 can dynamically update the preconfigured list using the NLP engine 118, artificial intelligence, one or more machine learning models, and user inputs. The action items can be provided based on the prediction values. For example, the action items can correspond to (i) plan for a better resource mix, (ii) plan for automated migration solution for cost effectiveness, and (iii) plan for dedicated governance considering the deal size, to name a few examples. The action items can be ranked initially and re-ranked later based on the actions taken by the intelligent action engine 130. In some cases, the intelligent action engine 130 can add new action items or remove action items to the items provided on the initial action item list.

The dynamic ranking engine 132 can generate recommended rankings for the list of actions from the intelligent action engine 130. The dynamic ranking engine 132 can use instant ranking and label ranking algorithms. Additionally, the dynamic ranking engine 132 can use bipartite ranking, k-partite ranking, and general instance ranking, to name a few examples. The ranking can be performed based on the weightages provided by the dynamic weightage engine 126, a cloud platform, a workload of the classification engine 122, a market, the one or more competitors, and the deal size.

The intelligent business case engine 134 can generate a business case for user 102 based on the opportunity. For example, the intelligent business case engine 134 can support the user 102's cloud journey decision making by presenting all the required aspects and facts covering migration, optimization, and transformation. The intelligent business case engine 134 can generate business cases for clients and a P&L statement for organization, along with horizon innovation initiatives. The intelligent business case engine 134 can rely on technical solutions, such as heuristic models, predictive analytics, and machine learning algorithms to achieve and generate the business case.

The intelligent proposal engine 136 can automatically generate a proposal response by taking inputs from various engines outputs in the classification engine 122, data provided by user 102, and data obtained from the opportunity database 110. The intelligent proposal engine 136 can recommend various options and ranks the options as actions based on the actions generated by the intelligent action engine 130. For example, the intelligent proposal engine 136 can use technology, such as, intelligent document reader, a natural language generator (NLG), and other functionalities to generate the proposal response for the opportunity.

The intelligent competition battlecard engine 138 can generate a battlecard that includes and highlights the strengths and weaknesses of the user 102, the competitors to user 102 pursuing the opportunity, and the opportunity itself. The intelligent competition battlecard engine 138 can generate a strategy that indicates how the user 102 can counter competitors. For example, the intelligent competition battlecard engine 138 can recommend sales tactics that user 102 should try for the opportunity that the competitors have not used in the past.

In some implementations, the input engines 114 can include a Lucene search functionality. The Lucene search functionality can include an ability to perform full text indexing, searching capability, ability to perform searching via Internet search engines, and on-site local searching. The Lucene search can also perform a fuzzy search based on edit distance. For example, the input engine can rely on Apache Lucene, which is a free and open-source search engine software library for parsing the data provided by the classification engine 122. In some implementations, the Lucene search can be included within the NLP engine 118. The Lucene search can search keywords and point of statements to return relevant information, as well as, match input and return a list of similar opportunities to connect and enhance response.

During stage (F), the input engine 114 can output the data generated by the classification engine 122 using an output engine 140. The data generated by the classification engine 122 can correspond to the insights associated with the opportunity requested for by user 102. As shown in system 100, the output of the classification engine 122 can include a predicted win percentage 142, a competition price range and list of actions 144, a battlecard and areas to strengthen 146, a list of similar opportunities to connect and enhance response 148, a ROM business case 150, and an auto-generated proposal 152. The output engine 140 can associate the data generated by the classification engines 122, e.g., the output data 140-152, with the data included in the input source 116. Then, the output engine 140 can store the associated data in the opportunity database 110 for later retrieval.

For example, the predicted win percentage 142 can indicate a 75% chance that user 102 can win the corresponding opportunity based on the received data 106 and the historic data from the opportunity database 110. The competition price range & list of actions 144 can indicate that competitors to user 102 may seek to pitch a particular monetary amount for the opportunity, e.g., $1.5 million for the opportunity. In addition, the competition price range & list of actions 144 can indicate the list of actions to take, such as reduce your (i) pitch price below the competitors, (ii) when pitching for this opportunity discuss particular data points, (iii) provide a particular business analysis of interest to the prospective client, and (iv) discuss potential beneficial perks for the prospective client not used by competitors, to name a few examples. Other examples are also possible. The list of actions can correspond to actions to take by the user 102 to improve the predicted win percentage 142.

The output engine 140 can also output a battlecard and areas to strengthen 146. The battle and areas to strengthen 146 can describe one or more strengths and weaknesses corresponding to the auto-generated proposal 152 for the opportunity. With the battlecard and areas to strengthen 146, the user 102 can determine how to improve the auto-generated proposal 152. This can include describing areas where the auto-generated proposal 152 is missing information, requires further elaboration on pricing points, description of product or service to be sold for the opportunity, including contact information for the user 102, and other pertinent information relevant to the opportunity.

The output engine 140 can also include the list of similar opportunities to connect and enhance response 148. This list of similar opportunities can describe relationships the user 102 may have had with other clients for a similar opportunity. For example, the list of similar opportunities can describe prior relationships that user 102 made with other clients and the characteristics of the relationship. The characteristics can include sales data, financial data, business improvements, and other data that benefitted the other clients. In this manner, the user 102 can include in their sales pitch how these other clients have improved efficiency, saved money, increased business, and other benefits by purchasing the service or product sold by user 102. Likewise, those same benefits can benefit the prospective client should they decide to purchase the service or product sold by user 102. This information can enhance the auto-generated proposal 152 to improve the chances of user 102 winning the opportunity.

The output engine 140 can also include a ROM business case 150 or a rough order of magnitude (ROM) business case 150. The ROM business case 150 can describe a rough estimate of all costs associated with a set of requirements, e.g., costs associated with the sale of the service or product sold by user 102 or a corporation of user 102. These requirements can correspond, for example, to an overall business cost of selling the service or product and even, can provide a rough estimate of the overall installation cost of the service or product, should the prospective client purchase the service or product.

More specifically, the ROM business case 150 may also include a more detailed cost analysis of the service or product for the prospective analysis. The more detailed cost analysis can include, for example, an engineering analysis for installation and maintenance of the service or product, cost references to certain local or third party databases for maintenance, development of alternative solutions for the service or product to fit the needs of the prospective client, labor, additional equipment, overhead, carrier recurring and non-recurring costs, travel cost amounts. The intelligent cloud advisor engine 112 may also be able to determine other requirements the prospective client likes to see in cost estimates and include those other requirements in the ROM business case 150.

The output engine 140 can also include an auto-generated proposal 152. The auto-generated proposal 152 can include various sections that describe the service or product to the prospective and why the prospective client should purchase the service or product from the user 102. The user 102 may be the expert in the service or product can clearly discuss any aspect included within the auto-generated proposal 152 with the prospective client. The auto-generated proposal can be focused on solutions of the service or product to focus on the needs of the prospective client. These solutions can be based on how the service or product has worked for other clients in the past similarly to how these solutions would work for the prospective client. For example, the auto-generated proposal 152 may be outlined in one example—an objective identifying user 102 and their corresponding service or product, a section addressing a current need or requirement that needs filling for the prospective client, how the user 102's service or product meets and/or fills the need or requirement for the prospective client, and proof indicating that service or product will in fact meet the need or requirement for the prospective client. Additionally, the auto-generated proposal 152 can include a detailed description that describes how the user 102's service or product can benefit the prospective client in a variety of ways, e.g., financially, efficiency, business improvements, and other ways, to name a few examples.

During stage (G), the output engine 140 can provide the output data 140-152 to the client device 104 of the user 102. For example, as illustrated in system 100, the output engine 140 can package the output data 140-152 into a package 141 that is to be transmitted to the client device 104. The intelligent cloud advisor engine 112 can transmit the package 141 over network 108 to the client device 104. Moreover, the intelligent cloud advisor engine 112 can transmit the package 141 to the opportunity database 110 over network 108 to retrieve at a later point in time.

In some examples, a terminal or display can be connected to the intelligent cloud advisor engine 112. The intelligent cloud advisor engine 112 can display the package 141 to a user interface on the display. The display can organize the user interface in such a manner that the user 102 can view and interact with each of the outputs. For example, the user 102 can include a graphical user interface (GUI) section for each of the predicted win percentage 142, the competition price range and list of actions 144, the battlecard and areas to strengthen 146, the list of similar opportunities to connect and enhance response 148, the ROM business case 150, and the auto-generated proposal 152. The GUI section for each of the outputs can be resized, adjusted, moved to different locations on the display, overlaid on one another, and scrolled through by the user 102 via a mouse/keyboard, verbal commands, or touch screen display. Similarly, these same GUI display elements and interaction can be performed on the client device 104.

The user can also provide feedback to the intelligent cloud advisor engine 112 from the display. For example, the user can provide updates to each of the outputs 142-152. These updates can include additional actions that the user 102 can take to improve their chances to win the opportunity, e.g., for the competition price range and list of actions 144, and additional areas to improve and strengthen auto-generated proposal 152 not currently described in the battlecard and areas to strengthen 146. The feedback can also include additional opportunities for enhancing the proposal not described in the list of similar opportunities to connect and enhance response 148. These additional opportunities may describe prior opportunities with other clients for a similar service and/or product to be sold by user 102. The feedback can also include a more detailed cost analysis or an indication of missing cost features to include in the ROM business case 150. Additionally, the feedback can correspond to edits to the auto-generated proposal 152. These edits can include, for example, stylistic edits, typographical edits, formatting edits to the proposal, a reordering of the sections of the proposal, and other edits.

In some implementations, the intelligent cloud advisor engine 112 can receive the feedback from the user 102 and provide the feedback throughout its various engines to produce new outputs. For example, the feedback can be provided through the intelligent document processing and OCR 120 to generate new outputs in the output engine 140. These outputs can be subsequently provided to the display of the intelligent cloud advisor engine 112 or to the display of the client device 104. In some cases, the intelligent cloud advisor engine 112 can provide both (i) the outputs to the display before feedback was received and (ii) the new output after the intelligent cloud advisor engine 112 received feedback to illustrate the changes to the outputs. For example, after receiving feedback, the predicted win percentage 142 may change from 75% to 90%, the competition price range & list of actions 144 may include fewer or more actions as well as different price ranges for more competitors. Similarly, the new output after receiving feedback may include different features for the battlecard and areas to strengthen 146, list of similar opportunities to connect and enhance response 148, ROM business case 150, and an updated auto-generated proposal 152.

In some implementations, the user 102 can provide feedback after submitting the auto-generated proposal 152 to the prospective client. The feedback can specifically come from the prospective client for the opportunity. By incorporating feedback from the prospective client and from other prospective clients, the intelligent cloud advisor engine 112 can improve its classification output overtime by moving its predictions closer to actualities for sales pitches for corresponding opportunities.

Figure 1B:
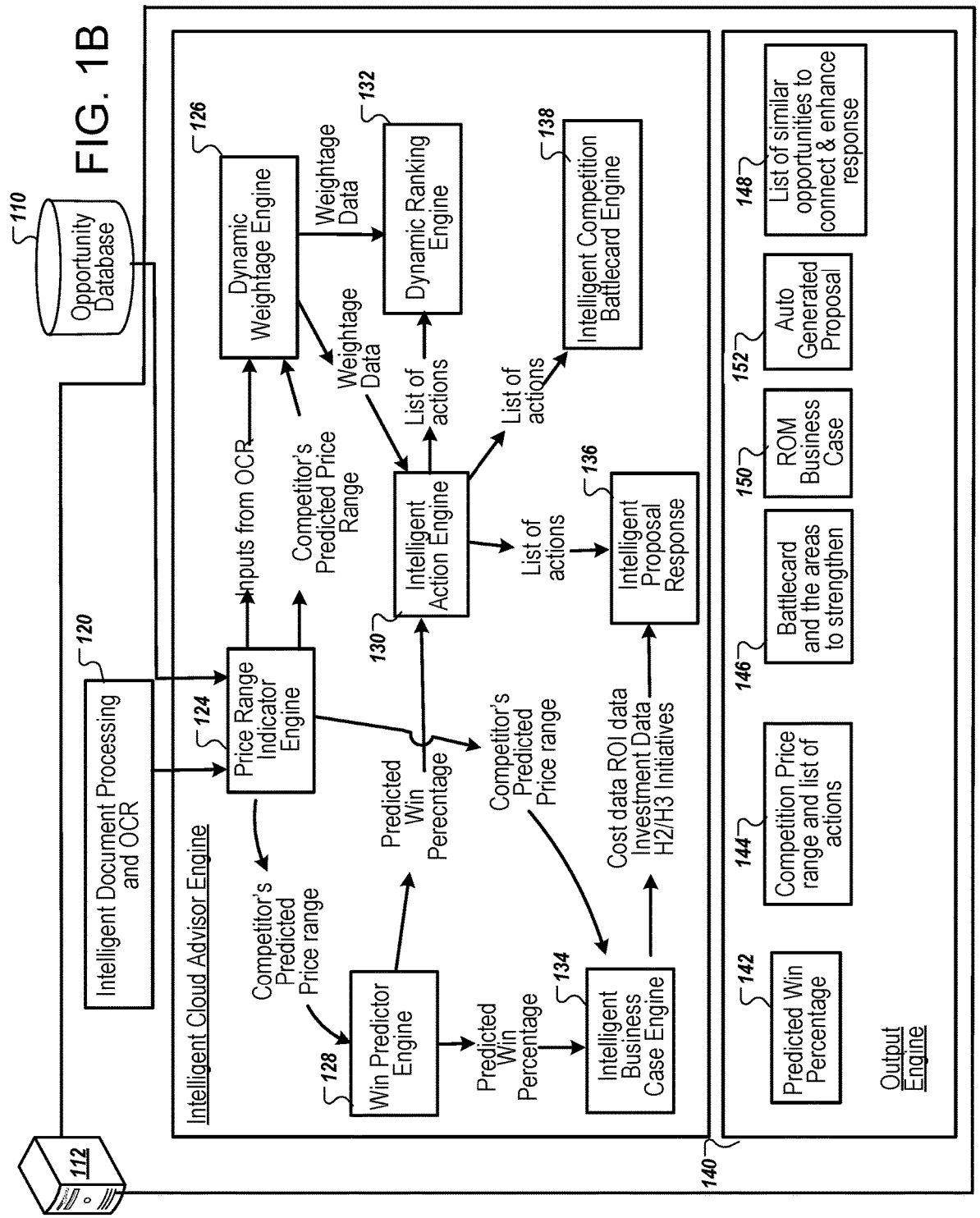
FIG. 1B is another block diagram that illustrates an example of a system for generating a proposal for an opportunity using an intelligent advisor engine.

FIG. 1B is another block diagram that illustrates an example of a system 101 for generating a proposal for an opportunity using an intelligent advisor engine. System 101 includes similar components and functions described with respect to system 100. As such, similar predictions will not be described again. System 101 further illustrates the various connections within the intelligent cloud advisor engine 112 and the data, which flows between the various interconnected classifiers.

For example, as described with respect to system 100, the intelligent document processing and OCR 121 provides output from its sentiment analyzer to the classification engine 122. The intelligent cloud advisor engine 112 include the price range indicator engine 124, the dynamic weightage engine 126, the win predictor engine 128, the intelligent action engine 130, the dynamic ranking engine 132, the intelligent business case engine 134, the intelligent proposal engine 136, and the intelligent competition battlecard engine 138. In some cases, each of the interconnected classifiers can rely on output from the other classifiers before generating its own output. The price range indicator engine 124 receives output from the intelligent document processing and OCR 120 to initiate the processing of generating output data for the output engine 140.

The price range indicator engine 124 can include various machine learning models, content based filtering, collaborative filtering, and hybrid content-collaborative filtering to generate and output a competition price range based on the inputs from the intelligent document processing and OCR 120. The price range indicator engine can output one or more competitor's predicted price range for an opportunity to multiple engines: the win predictor engine 128, the dynamic weightage engine 126, and the intelligent business case engine 134. Moreover, the price range indicator engine 124 can provide the inputs from the intelligent document processing and OCR 120 to the dynamic weightage engine 126. The intelligent cloud advisor engine 112 can also store the inputs from the intelligent document processing and OCR 120 and the one or more competitor's price range in the opportunity database 110.

The dynamic weightage engine can receive (i) the inputs from the intelligent document processing and OCR 120 and (ii) the one or more competitor's predict price range from the price range indicator engine 124. In response, the dynamic weightage engine 126 can generate weightage data, e.g., custom weights associated with each data category, and provide the weightage data to the dynamic ranking engine 132 and the intelligent action engine 130. The intelligent cloud advisor engine 112 can also store the weightage data in the opportunity database 110.

The win predictor engine 128 can receive the one or more competitor's predicted price range from the price range indicator engine 124 and generate the predicted win percentage. The win predictor engine 128 can provide the generated win percentage to the intelligent action engine 130 and the intelligent business case engine 134. The intelligent cloud advisor engine 112 can also store the generated win percentage in the opportunity database 110.

The intelligent action engine 130 can receive the predicted win percentage from the win predictor engine 128 and the weightage data from the dynamic weightage engine 126. In response, the intelligent action engine 130 can generate a list of actions. The intelligent action engine 130 can provide the list of actions to the dynamic ranking engine 132, the intelligent competition battlecard engine 138, and the intelligent proposal engine 136. The intelligent cloud advisor engine 112 can also store the list of actions in the opportunity database 110.

The dynamic ranking engine 132 can receive the list of actions from the intelligent action engine 130 and the weightage data from the dynamic weightage engine 126. In response, the dynamic ranking engine 132 can output ranked orders of the list of actions, based on the weightage data, and provide that output within the competition price range and list of actions 144. The intelligent cloud advisor engine 112 can also store the output ranked orders of the list of actions in the opportunity database 110.

The intelligent business case engine 134 can receive the predicted win percentage from the win predictor engine 128 and the one or more competitor's predicted price range from the price range indicator engine 124. In response, the intelligent business case engine 134 can output various data points to provide to the intelligent proposal engine 136. For example, the various data points can include cost data, return on investment (ROI) data, investment data, and H2/H3 initiatives. The H2/H3 initiatives can correspond to different initiatives for product or service growth. For example, H2 initiatives can represent current work being performed over time to ultimately become core businesses. These businesses can be outside business from the current core business of a company to require new capabilities and time to build. H2 initiatives can include potential to shift a company's current revenue plans to replace a current cash generator. H3 initiatives can represent nascent business ideas and opportunities that can correspond to future growth engines for a company. However, H3 initiatives may include risks because they do not have probable outcomes, but these business ideas may ultimately change a course of a business. The intelligent cloud advisor engine 112 can also store the various data points in the opportunity database 110.

FIG. 1B also illustrates the various outputs in the output engine 140. As described with respect to system 100, the output engine 140 can output the various outputs, e.g., 142-152, to the user 102 for review.

Figure 2A:
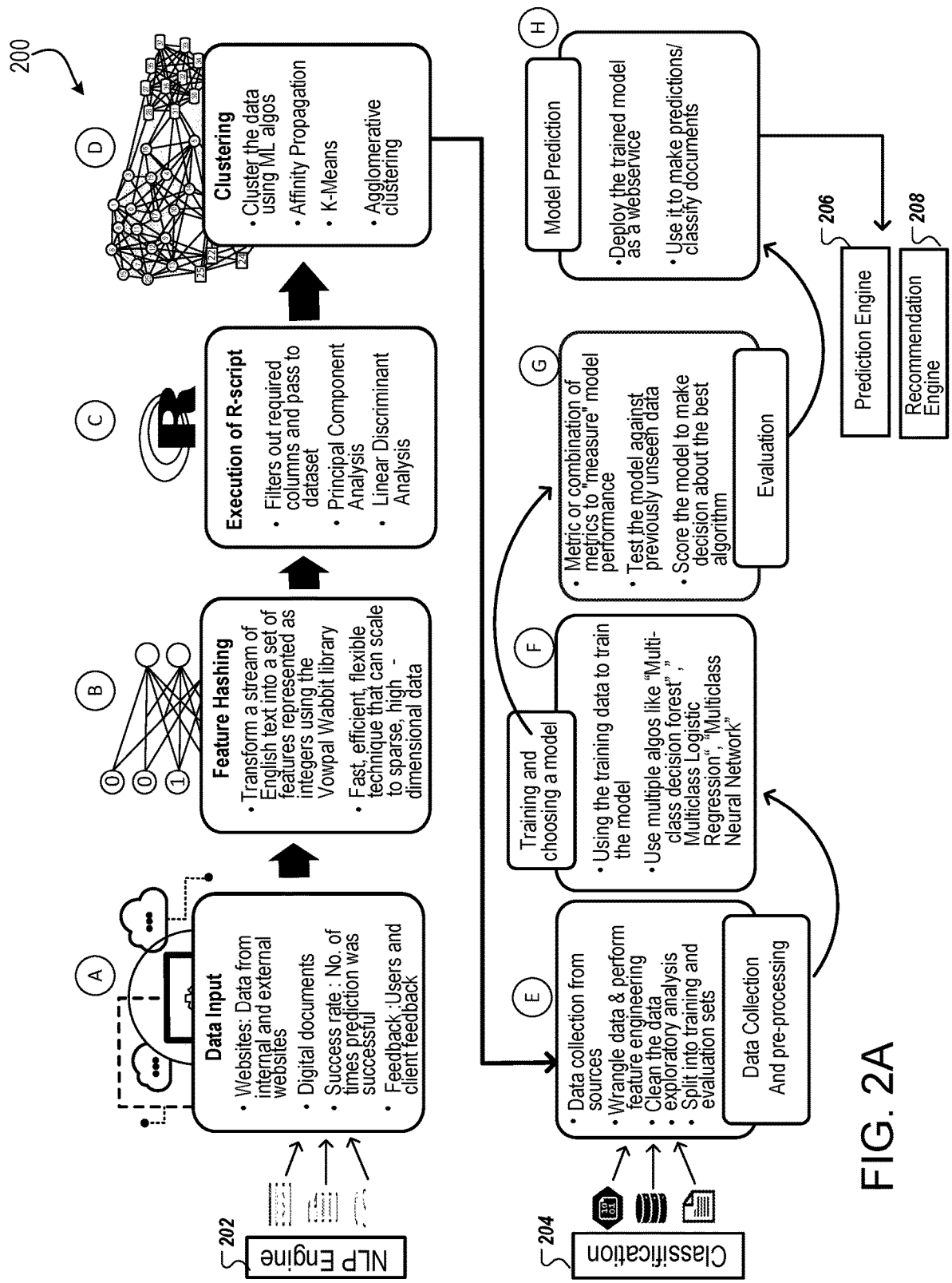
FIG. 2A is a block diagram that illustrates an example of a system for generating prediction engines.

FIG. 2A is a block diagram that illustrates an example of a system 200 for generating prediction engines. System 200 includes the NLP engine 202, the classification engine 204, a prediction engine 206, and a recommendation engine 208, and corresponding functions performed by each of these engines. The NLP engine 202 and the classification engine 204 are similar to the NLP engine 118 and the classification engine 122 of system 100. The prediction engine 206 and the recommendation engine 208 will be further described below with respect to FIG. 2B. Specifically, the system 200 illustrates how the NLP engine 118 and the classification engine 122 can be trained to produce the corresponding outputs, e.g., the prediction engine 206 and the recommendation engine 208. FIG. 2A illustrates various operations in stages (A) through (H) which can be performed in the sequence indicated or another sequence.

During stage (A), the NLP engine 202 can receive data corresponding to the opportunity. For example, the data can be received from the user and data from an opportunity database. The data can correspond to website data, from websites internal to a corporation of the user and from websites external to the corporation of the user. The data can also include digital documents, e.g., emails, PowerPoints, PDFs, word documents, and other documents. The data can describe financial transactions of prior opportunity transactions, information regarding a current opportunity, and prior data regarding the relationship with a prospective client for the current opportunity. Additionally, the data can include a success rate regarding the prediction engine 206's prior predictions. For example, the data can indicate that the prediction engine 206 has a 75% success rate for predicting whether a user will win an opportunity for prior opportunities. This obtained data can be used to train a machine learning model.

During stage (B), the NLP engine 202 can perform feature hashing on the received data. For example, the NLP engine 202 can perform one or more functions that can transform a stream of text, e.g., English text, into feature vectors represented as integers. These integer features can correspond to relevant information extracted from the received data. This process by the NLP engine 202 of extracting relevant features from the received data can be quick and efficient and map the integers to high-dimensional data sets. These high-dimensional data sets can correspond to feature vectors, where each vector can be mapped to an N-dimensional data space. For example, the dimensionality can correspond to a 128 dimensional space. For example, one such method of extracting and converting the received data to features can be performed using an external machine learning processing system.

During stage (C), the NLP engine 202 can perform execution of a script for managing the feature vectors. For example, the execution of a script can performed using Java, Python, R, MATLAB, or some other programming language. The execution of the script can perform the following filtering functions: (i) filter out columns of the features and pass to various datasets, (ii) principal component analysis, and (iii) linear discriminant analysis. Principal component analysis corresponds to reducing a dimensionality of a data set consisting of a large number of interrelated variables, while retaining as much as possible of the variation present in the data set. Various statistical means and determinations can be performed during the principal component analysis. Linear discriminant analysis corresponds to determining a linear combination of features that characterize or separates two or more classes of object or events. Linear discriminant analysis is typically performed objects or events are further classified, such as for reducing dimensionality. For example, linear discriminant analysis can correspond to a maximum likelihood, Bayes discriminant rule, and fisher's linear discriminant rule, to name a few examples.

During stage (D), the NLP engine 202 can perform clustering of the redefined datasets from the managing script features. For example, the NLP engine 202 can be performed using different machine learning algorithms trained to identify and categorize objects and/or events into different categorical sets. In another example, the NLP engine 202 can perform affinity propagation, K-means clustering, and agglomerative clustering for grouping together similar features from the datasets. After the data has been clustered, the data is ready for classification for training the classification engines.

During stage (E), the classification engine 204 can receive the clustered datasets from the NLP engine 202 and perform data collection and pre-processing. For example, the classification engine 204 can collect data from various internal and external sources regarding the opportunity and corresponding prospective client along with the clustered data. The classification engine 204 can perform data wrangling or data munging, which is the process of transforming and mapping data from one raw data format into another data format, with the intent of making the data appropriate for processes downstream for classification. For example, data wrangling can also include data visualization, data aggregation, training a statistical model, and structuring the output data to be used by later functions.

The classification engine can also perform other functions on the data, such as, functions for feature engineering, cleaning the data, and ultimately, dividing the data into training and evaluation sets for the machine learning models of the classification engine 204. Once the data has been pre-processed, the classification engine 204 can train the various models.

During stage (F), the classification engine 204 can train one or more machine learning algorithms to produce a trained model. The one or more machine learning models can be trained using various training algorithms, such as, multi-class decision forest, multiclass logistic regression, and multiclass neural network. The classification engine 204 can train the one or more machine learning algorithms to produce the trained models illustrated in system 100. Namely, these trained models correspond to the price range indicator engine 124, the dynamic weightage engine 126, the win predictor engine 128, the intelligent action engine 130, the dynamic ranking engine 132, the intelligent business case engine 134, the intelligent proposal engine 136, and the intelligent competition battlecard engine 138. Once these models have been initially trained, the classification engine 204 can perform further processes on these trained models for evaluation purposes.

During stage (G), the classification engine 204 can evaluate each of the trained machine learned models. The classification engine 204 can rely on various metrics to measure the performance of each of the models. For example, the classification engine 204 can first test the model with evaluation data to determine the trained model(s) produce the correct output. For example, whether the trained models produce the correct win prediction regarding an opportunity associated with a prior opportunity. In another example, the trained models can be trained on evaluation data that tests whether they produce a similar auto-generated proposal as to a previous proposal generated for a prior opportunity.

Once the classification engine 204 determines the trained models are properly producing the correct data using the evaluation data sets, then the classification engine 204 can test the trained models on unseen data acquired from external/internal data sources, for example. The classification engine 204 can then score each of the models based on their corresponding output for the evaluation data sets and the unseen data sets. If a trained model is scored below a threshold value, e.g., below 65%, then the classification engine 204 can retrain that particular model with a different machine learning training algorithm and/or different evaluation data sets until that model produces proper outputs. If the model is then scored with a value higher than the threshold, the model is ready for deployment.

During stage (H), the classification engine 204 can deploy the trained model(s) that are scored higher than a threshold. The classification engine 204 can deploy the trained model(s) as a web service, as a client device service, a Chabot service, or as some other web service that can be deployed by the intelligent cloud advisor engine. Once deployed, these trained models can be used to make predictions, classify documents, and other functions, e.g., such as the functions described with respect to system 100. As illustrated in system 200, the classification engine 204 can produce two trained machine-learning models, e.g., prediction engine 206 and recommendation engine 208.

Figure 2B:
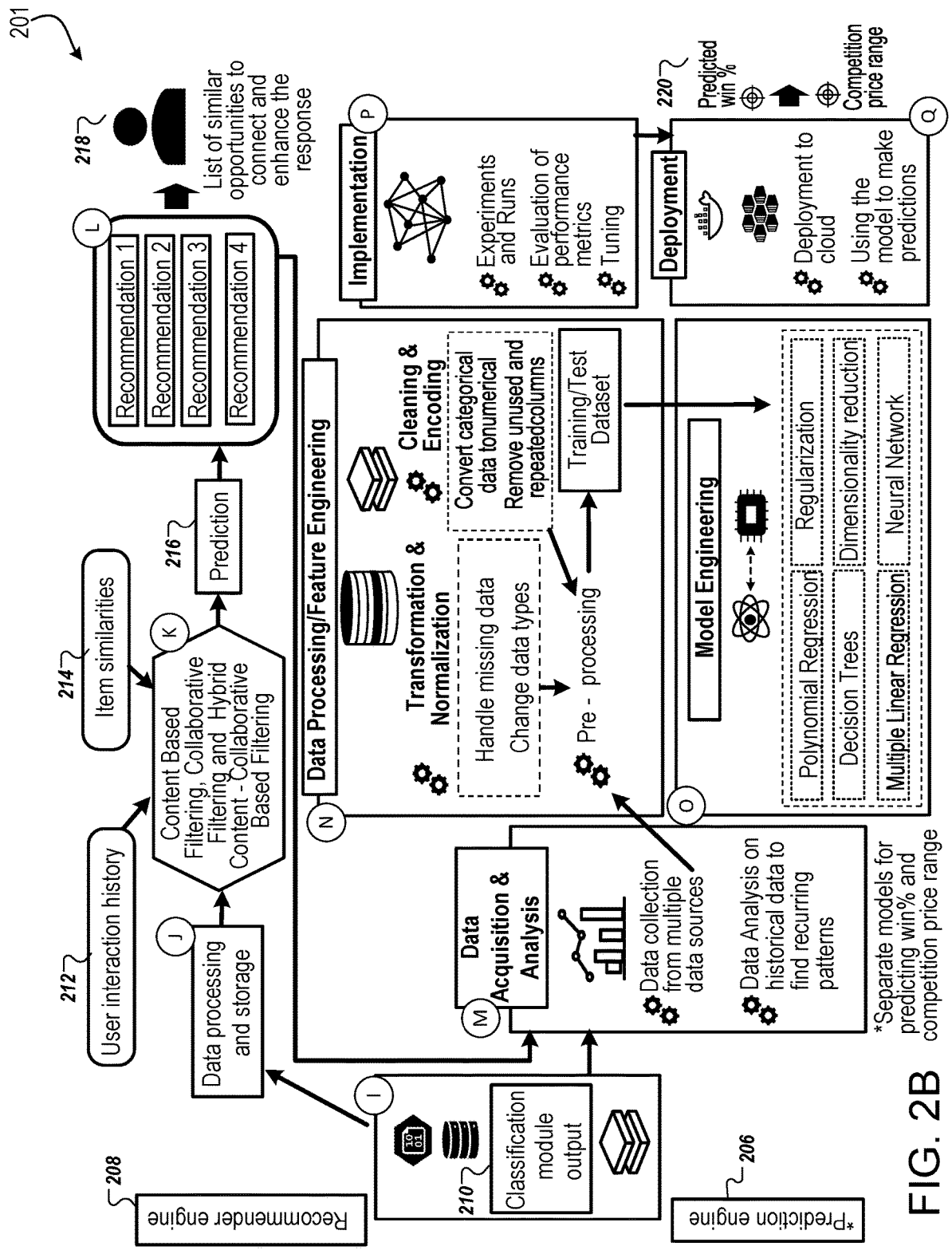
FIG. 2B is a block diagram that illustrates an example of a system for generating a predicted win percentage and a competition price range based on the opportunity.

FIG. 2B is a block diagram that illustrates an example of a system 201 for generating a predicted win percentage and a competition price range based on the opportunity. The system 201 includes the recommendation engine 208 and the prediction engine 206 implemented from system 200. As such, system 201 is a continuation of system 200, after the recommendation engine 208 and the prediction engine 206 have been deployed. FIG. 2B illustrates various operations in stages (I) through (Q) which can be performed in the sequence indicated or another sequence.

In some implementations, the recommendation engine 208 can offer relevant suggestions to users. The recommendation engine 208 can generate recommendations to users based on the item similarities or user interaction history. Typically, machine-learning algorithms in the recommendation engine 208 can be classified into two categories—content based and collaborative filtering/hybrid methods. Content based methods are based on similarity of item attributes and the collaborative methods calculate similarity from interactions. In the recommendation engine 208, input is taken from the classification model output, and the engine 208 aids to generate and provide recommendations to the users, about previous deals. These recommendations can guide the user to understand what was the win percentage in that deal, the competition price range, technology solution, resources allocated, and so on. The output of the recommendation engine 208 can be displayed to a user and/or provided as input to the prediction engine 206. The prediction engine 206 can include different internal modules, in which the first module corresponds to a "Data Acquisition and Analysis."

Initially, data is collected from various sources to identify the relationship and impact of variables. Data is collected from websites, internal and external, digital documents, success rate, e.g., number of times prediction was successful, and the like. In response, the data processing/feature engineering is performed in which standardized formats are applied, incorrect data is replaced, and data augmentations and enhancements are performed. More dimensionality is inserted into the data with pre-calculated amounts and aggregate information as needed, and extraneous information is removed and deduplication is performed. The data is split into training, test, and validation sets. Then, model engineering is performed on the data.

In the model engineering module, a model is selected from multiple models containing different sets of predictors in order to select the best performing model that minimizes the prediction error. In this, a regression analysis is formed in the predictive engine 206 where an investigation is made into the relation between a dependent variable, e.g., target, and an independent variable, e.g., predictor. This technique is used for forecasting, time series modeling and finding the causal effect relationship between the variables. Some regression regularization methods include, for example, Lasso, Ridge, and ElasticNet, which work well in the case of high dimensionality and multi-collinearity among the variables in the data set. The linear model selection approaches include the best subsets from regression and stepwise regression. The right algorithm based on the learning objective and data requirements are selected. Then, requirements are selected for the model's operation and deployment, a check is made to determine whether model explainability or interpretability is required. When the system is sufficiently confident that the machine learning model can work based on training, the trained machine learning model can be deployed with a means to measure and monitor performance.

A baseline may be generated against which future iterations of the trained machine learning model can be measured. And finally, the system can continuously iterate on different aspects of the trained machine learning model to improve overall performance. In a real world environment, business requirements change, technologies change, data ultimately changes—all of which might create new requirements for deploying the model multiple times. Thus, it is required to determine solutions to "model drift" or "data drift," which can cause changes in model accuracy and performance due to changes in real-world data, improvements in model performance and accuracy, improvements of model for further capabilities, developing automation capabilities for model training, and improving deployment. The output of the prediction engine 206 is the likely predicted win percentage and the competition price range for the input deal or opportunity.

During stage (I), the classification engine 204 provides a classification module output 210. The classification module output 210 can include each of the engines included within the classification engines 122, and data corresponding to a particular opportunity. In particular, the prediction engine 206 can include the win predictor engine 128 and the price range indicator engine 124. The recommendation engines can include the intelligent action engine 130, the intelligent business case engine 134, and the intelligent competition battlecard engine 138.

During stage (J), the recommendation engine 208 performs data processing and storage. In this stage, the recommendation engine 208 can obtain data from a user associated with an opportunity. Stage (J) is similar to stage (A) from system 100.

During stage (K), the recommendation engine 208 can receive user interaction history 212, item similarities 214, and data from the processing and storing during stage (J). The recommendation engine 208 can then use, for example, content based filtering, collaborative filtering, and hybrid content—collaborative based filtering to produce one or more competitor's price range. For example, this stage is similar to the processes performed by the price range indicator engine. In some implementations, stage (K) can also include the processes performed by the win predictor engine. Thus, the win predictor engine can take the one or more competitor's price range and output a win prediction rate. The prediction 216 can correspond to the predicted win percentage.

During stage (L), the recommendation engine 208 can receive the prediction 216 and generate a list of recommendations. The processes performed stage (L) is similar to the processes performed by the intelligent action engine. The intelligent action engine, as shown in system 201, produces a list of actions or recommendations 218 that can be used to enhance the response for pursuit of the opportunity. Then, the recommendation engine can provide the list of similar opportunities and recommendations to the data acquisition and analysis.

During stage (M), the data acquisition and analysis receives the list of recommendations 218 from the intelligent action engine. Additionally, the data acquisition & analysis can receive the classification module output 210. During the data acquisition and analysis, the prediction engine can perform data collection from multiple data sources and data analysis on historical data to find recurring patterns. The data acquisition & analysis can include separate models for predicting win percentage and competition price range.

During stage (N), the data collected from multiple sources and analysis trends from historical patterns are provided to the data processing and feature engineering. In particular, during stage (N), the aggregated data are transformed and normalized to handle the variety of data types. For example, categorical data types are converted to numerical data types, e.g., feature processing, and unused and repeated columns are removed.

During stage (O), the classification engine can perform model-engineering procedures, which helps reduce the dimension of data. For example, these features can include polynomial regression, decision trees, multiple linear regression, regularization, dimensionality reduction, and training one or more neural networks. The classification engine can process the feature data sets before implementation and deployment.

During stage (P), the classification engine can implement the trained machine learning models. For example, the classification engine can train, test the machine learning models by evaluation of known and unknown data sets, and can tweak the machine learning models based on their input/output relationships. The classification engine can perform the implementation of the machine learning models across multiple servers to speed up training of the models. The servers can process the machine learning models across one or more processors, e.g., GPUs and CPUs, for a sped up training process.

During stage (Q), the classification engine can deploy the trained machine learning models. The deployment of the trained machine learning models can be provided to a cloud service, a Chabot, another server, or a client device. The trained machine learning models can make predictions regarding the pursuit of opportunities, e.g., predicted win percentage, competitor's price range, and others. The cloud service or devices managing the trained machine-learning model can provide feedback to the server or service that trained the machine learning models for updating the machine-learning model. Should the machine learning models produce an incorrect prediction or recognize data that it has not been trained on, the cloud service or devices can provide a version of the model and the input data to the server for retraining or tweaking of the machine learning models. Once the server sufficiently retrains the machine learning model with the new data, the server can deploy the retrained machine learning model to be used for predictions, e.g., such as the predictions described with respect to system 100.

FIG. 3A is a user interface 300 that illustrates an example of a business case. For example, the user interface 300 illustrates a ROM business case output, such as a ROM business case 150 from system 100. The ROM business case output user interface can indicate total revenues, cost of services, Contract Controllable Income (CCI), and Operating Income (OD. The user interface 300 also includes different tabs that a user can interact with on their client device or terminal connected to the intelligent cloud advisor engine. For example, the tabs include an opportunity profile, an effort estimator, a dashboard, an H2 initiative, a consolidated ACC P&L, a client business case, and migration screens. The user to show a prospective client during the provisioning of the auto generated proposal can view each of these tabs. In some examples, the user interface 300 provides multiple cost estimates between an H1 horizon and an H1 and H2 horizon initiatives. In this manner, the user is able to view the data and make informed decisions regarding pursuit of the opportunity with the prospective client.

FIG. 3B is another user interface 301 that illustrates an example of a business case. The user interface 301 illustrates a display when a user interacts with the client business case tab. The user interface 301 is another view of the user interface 300 between different tab selections. As previously indicated, a user can select between the different tabs and view different user interfaces, e.g., user interface 300 by selecting consolidated ACC P&L and user interface 301 by selecting client business case.

The user interface 301 illustrates an amount to be spent for the client for a particular fiscal year. For example, the user interface 301 illustrates a total amount of money, in millions, to be spent by a particular client across 10 years for IT spend, IT Spend AS-IS, Horizon 1 To-Be, Horizon 1 Savings, Horizon 1 Savings %, Horizon 2, and Horizon 1+Horizon 2 Savings. Additionally, the user interface 301 illustrates an amount of money, in millions, to be spent, by the particular client from each year from year 1 to year 10. This information can be beneficial for a prospective client seeking to know how much will be spent should they purchase a service or product from a particular user or salesperson.

Figure 4:
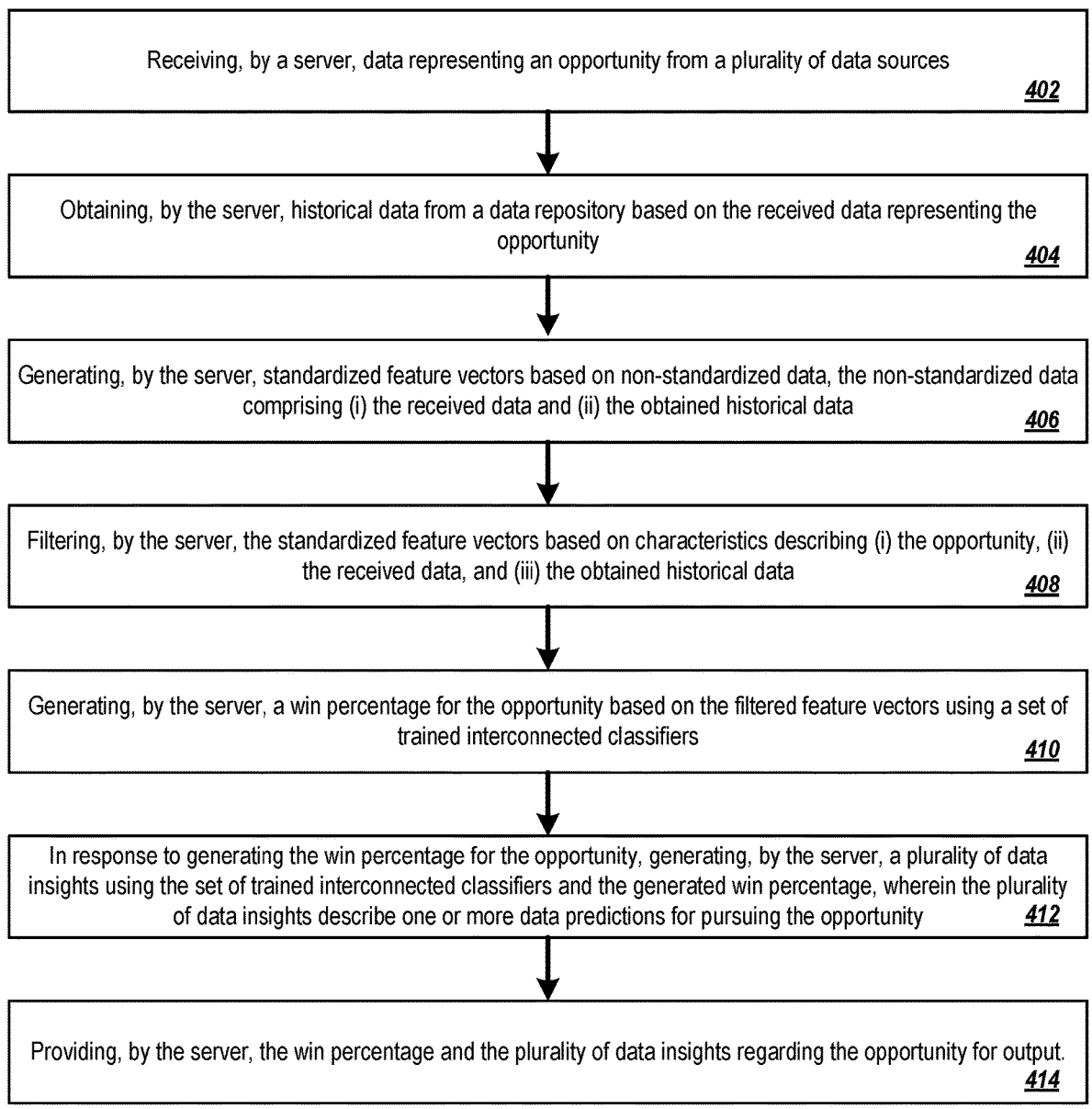
FIG. 4 is a flow diagram that illustrates an example of a process for generating a proposal for an opportunity using an intelligent advisor engine.

FIG. 4 is a flow diagram that illustrates an example of a process 400 for generating a proposal for an opportunity using an intelligent advisor engine. The intelligent cloud advisor engine 112 of system 100 can perform the process 400.

The intelligent cloud advisor can receive data representing an opportunity from a plurality of data sources (402). For example, the intelligent cloud advisor can receive a request from a user to generate a proposal and other insights regarding a potential opportunity. The opportunity may corresponds to a sales opportunity that the user desires to pursue. The user can corresponds to a businessperson at a company, e.g., a sales representative, a sales clerk, a CEO, a CFO, a technical writer, or another individual, seeking information regarding a proposal for an opportunity. The user may seek how to win a contract associated with the opportunity for a potential or prospective client to purchase a product or service sold by the company that employs the user.

The user can provide data representing the opportunity to the intelligent cloud advisor. This data, which may describe a sales pitch for the opportunity, can be provided from a plurality of data sources, such as, for example, web documents, emails, financial transactions, mobile communications, digital documents, and client data associated with the opportunity. Each of these can correspond or be relevant to the opportunity. Moreover, the user can provide information that describes the potential opportunity to the intelligent cloud advisor. This information can include, for example, data that describes the opportunity, data that describes other competitors seeking the same opportunity, data describing the company or prospective client that is being approached for the opportunity, e.g., their name, prior relationship history with the user, such as opportunities and deals, associated with both the competitors and the company being approached for the opportunity. This information can be provided in the form of the digital data discussed above and others, e.g., web sites, transactional data, historical financial data, emails between user and the company being approached, emails between user and competitors for this opportunity, as well as attachments from those emails, to name a few examples. The user can also provide authentication credentials to the intelligent cloud advisor to authenticate use of generating insights for the opportunity.

The intelligent cloud advisor can obtain historical data from a data repository based on the received data representing the opportunity (404). In some implementations, the intelligent cloud advisor can retrieve data from an opportunity database, e.g., the data repository, in response to receiving the data from the user for the potential opportunity. Once the intelligent cloud advisor authenticates the user's access, the intelligent cloud advisor can obtain historical data from the opportunity database based on the data received from the user. For example, the intelligent cloud advisor may receive information regarding a prospective client associated with the opportunity, such as a name or another reference. The intelligent cloud advisor can use the identification of the prospective client to access historical data within the opportunity data. For example, the intelligent cloud advisor can retrieve historical data associated with the client by using the identification of the client, e.g., client name, as an index in the opportunity database. In response to the identification of the client matching to a particular index in the opportunity database, the intelligent cloud advisor can grab the historical data associated with that index.

The historical data retrieved from the opportunity database at the index can include financial data associated with a particular client, digital documents associated with the particular client, and previous predictions generated by the intelligent cloud advisor associated with the client for prior opportunities. The opportunity database can store this historical data for a plurality of clients. Additionally, the financial data can include opportunity related information, such as, business transactions, sales sheets, financial transactions, emails between user and the client, and other digital documents. The intelligent cloud advisor can acquire this data from the opportunity database for processing to generate insights regarding the potential opportunity.

The intelligent cloud advisor can generate standardized feature vectors based on non-standardized data, the non-standardized data comprising (i) the received data and (ii) the obtained historical data (406). In particular, the intelligent cloud advisor can an intelligent document processing and OCR module that processes the received data from the user and the obtained historical data to generate the insights for the opportunity. The intelligent document processing and OCR module can transform the received data that is unstructured and/or semi-structured data into data that is usable and understandable. The intelligent document processing and OCR module can use artificial intelligence, such as, natural language processing (NLP), computer vision, and other deep learning algorithms to extract relevant information or from the usable documents, classify the documents into a classification type, and categorize the classified documents. For example, the NLP engine within the intelligent document processing and OCR module can transform the text found within the received data from the user and the historical data into feature vectors.

First, the NLP engine can perform tokenization on the data received from the user and the historical data. Tokenization is the process by which a sample of text is split into one or more tokens based on particular delimiters. The NLP engine can parse the text into tokens based on delimiters such as, spaces, commas, semi-colons, letters, and other defined delimiters. Next, the NLP engine can perform lemmatization on the tokens, POS tagging for each of the tokens, entity recognition, and sentiment analyzing.

In response to the NLP engine processing the text, the NLP engine can transform the analyzed tokens into feature vectors by a process known as feature hashing. The NLP engine can perform feature hashing by transforming the series of text into feature vectors represented as integers, which represent the relevant information extracted and transformed from the received data. These integers or feature vectors can correspond to values that can be mapped into dimensional data sets, where the dimension data sets can range from a single dimension to N dimensions, e.g., 128 dimensional space.

The intelligent cloud advisor can filter the standardized feature vectors based on characteristics describing (i) the opportunity, (ii) the received data, and (iii) the obtained historical data (408). In response to generating the feature vectors, the NLP engine can execute a script for managing and reducing a dimensionality of the feature vectors. For example, the script can be executed in a programming language of one or more of Java, Python, R, MATLAB, C++, or some other programming language. A reduction in dimensionality of the feature vectors can correspond to a reduction in processing performed by the intelligent cloud advisor, and a quicker turn around time for the insights of the potential opportunity. For example, the script can be configured to perform the following filter functions for the feature vectors: (i) filter out columns of the feature vectors and pass to various datasets, (ii) principal component analysis, and (iii) linear discriminant analysis.

The intelligent cloud advisor can filter out one or more columns of the feature vectors based on the contexts. In particular, a relationship exists between a feature vector and corresponding text from the received data in which the feature vector was generated from. The intelligent cloud advisor can filter out feature vectors whose text was not found in data entered by the user. For example, if the intelligent cloud advisor was processing text from the historical data and no match exists between data provided by the user and historical data, then the intelligent cloud advisor can filter out the unmatched text from the historical data. Similarly, if the data received from the user includes parts of speech with no relevant context, e.g., articles for parts of speech, then the intelligent cloud advisor can filter out such text. Moreover, if the intelligent cloud advisor determines that the text is not relevant to the potential opportunity, the intelligent cloud advisor can filter out the text and corresponding feature vectors.

The script executed by the intelligent cloud advisor can also perform other filtering functions, such as, principal component analysis and linear discriminant analysis. Principal component analysis can correspond to reducing a dimensionality of a data set consisting of a large number of interrelated variables, while retaining as much as possible of the variation present in the data set. Various statistical means and determinations can be performed during the principal component analysis. Linear discriminant analysis can correspond to determining a linear combination of features that characterize or separates two or more classes of object or events.

Moreover, the intelligent cloud advisor can perform clustering of the filtered feature vectors to reduce the dimensionality of the data further. For example, the NLP engine of the intelligent cloud advisor engine can perform clustering of the feature vectors in the mapped data sets. The NLP engine can perform clustering by affinity propagation, K-means clustering, and agglomerative clustering for grouping together similar feature vectors from the datasets. After the data has been filtered, the intelligent cloud advisor is ready to for classification of the filtered feature vectors.

The intelligent cloud advisor can generate a win percentage for the opportunity based on the filtered feature vectors using a set of trained interconnected classifiers (410). The intelligent cloud advisor can include a set of interconnected classifiers that can predict and generate insights regarding the opportunity provided by the user. The set of interconnected classifiers can generate a win prediction for the opportunity, a competition price range for the opportunity, and other insights by leveraging the received data and the historical data. For example, the set of trained interconnected classifiers can include a price range indicator engine, a dynamic weightage engine, a win predictor engine, an intelligent action engine, a dynamic ranking engine, an intelligent business case engine, an intelligent proposal engine, and an intelligent competition battlecard engine.

The price range indicator engine can generate a competition price range based on the filtered feature vectors provided by the intelligent document processing and OCR module. The price range indicator engine can use a variety of machine learning models, content based filtering, collaborative filtering, and hybrid content-collaborative based filtering. The price range indicator engine can provide the competition predicted price range for the competitors also pursuing the opportunity to the win predictor engine for generating the predicted win percentage.

The win predictor engine can generate a percentage that describes the user's chances of winning the opportunity based on the competitor's predicted price range. The win predictor engine can also generate the win percentage based on user inputs and historical data using one or more machine learning models. The output of the win predictor engine can be a statistical value, a percentage, or another data point that describes the user's chances of winning the opportunity.

In response to generating the win percentage for the opportunity, the intelligent cloud advisor can generate a plurality of data insights using the set of trained interconnected classifiers and the generated win percentage, wherein the plurality of data insights describe one or more data predictions for pursuing the opportunity (412). The intelligent cloud advisor can use the competitor's predicted price range, the win percentage, and the remaining classification engines to generate the plurality of data insights. The remaining classification engines as described below can include the dynamic weightage engine, the intelligent action engine, the dynamic ranking engine, the intelligent business case engine, the intelligent proposal engine, and the intelligent competition battlecard engine.

The dynamic weightage engine can generate custom weights associated with each data category provided by the input source, the NLP engine, and the sentiment analyzer. In particular, the dynamic weightage engine can compute or determine weightages based on user inputs/historical data using one or more machine learning algorithms and predict maximum likelihood results for user. The dynamic weightage engine can generate these weights as percentages, numbers, labels, or other values to indicate to the other classification engines where to weight the data.

The intelligent action engine can generate a set of action items for user to take for pursuing the opportunity. The intelligent action engine can generate the set of action items for the user based on the win prediction percentage and the competition price range output by the win predictor engine and the price range indicator engine, respectively. The action items may be generated based on weights and predicted win percentage, which were taken on evaluated and recommended historical opportunities.

The dynamic ranking engine can generate recommended rankings for the list of actions from the intelligent action engine. The dynamic ranking engine can use instant ranking and label ranking algorithms. Additionally, the dynamic ranking engine can use bipartite ranking, k-partite ranking, and general instance ranking, to name a few examples.

The intelligent business case engine can generate a business case for user based on the opportunity. For example, the intelligent business case engine can support the user's cloud journey decision making by presenting all the required aspects and facts covering migration, optimization, and transformation. The business case may be generated based on inputs passed to recommendation, classification, and prediction engines.

The intelligent proposal engine can automatically generate a proposal response by taking inputs from various engines outputs in the classification engine, data provided by user, and data obtained from the opportunity database. The intelligent proposal engine can recommend various options and ranks the options as actions based on the actions generated by the intelligent action engine.

The intelligent competition battlecard engine 138 can generate a battlecard that includes and highlights the strengths and weaknesses of the user 102, the competitors to user 102 pursuing the opportunity, and the opportunity itself. The intelligent competition battlecard engine 138 can generate a strategy that indicates how the user 102 can counter competitors.

The data generated by the classification engine can correspond to the insights associated with the opportunity requested for by the user. For example, the outputs include: (i) a predicted win percentage generated by the win prediction engine; (ii) a competition price range generated by the price range indicator engine; (iii) a list of actions to be taken to improve the chances of winning the opportunity generated by the intelligent action engine; (iv) one or more options for inclusion in a proposal response, e.g., the auto-generated response, generated by the intelligent proposal response; (v) a battlecard representing strategy and/or areas of strengths and weaknesses associated with proposal response; (vi) a business case for pursuing the opportunity generated by the intelligent business case engine; (vii) one or more custom weights associated with the data from the received data and the historical data generated by the dynamic weightage engine; and, (viii) a ranked listing of actions associated with the plurality of actions based on the one or more weights, the ranked listing generated by the dynamic ranking engine.

The intelligent cloud advisor can provide the win percentage and the plurality of data insights regarding the opportunity for output (414). The intelligent cloud advisor can provide the win percentage and the plurality of data, e.g., output data, to the client device of the user. In another example, the intelligent cloud advisor can provide the output data to a terminal or display coupled to the intelligent cloud advisor for the user to review. The display can organize the user interface in such a manner that the user can view and interact with each of the outputs. For example, the user can include a graphical user interface (GUI) section for each output from the output data. The GUI section for each of the outputs can be resized, adjusted, moved to different locations on the display, overlaid on one another, and scrolled through by the user via a mouse/keyboard, verbal commands, or touch screen display. Similarly, these same GUI display elements and interaction can be performed on the client device.

The user can also provide feedback that describes corrections to the output data or the insights generated by the intelligent cloud advisor for pursuing the opportunity. The feedback can include updates to each of the outputs output by the set of interconnected classifiers. These edits can include, for example, stylistic edits, typographical edits, formatting edits to the proposal, a reordering of the sections of the proposal, numerical edits, and other edits. The intelligent cloud advisor can generate new output using the feedback data and can provide both (i) the outputs to the display before feedback was received and (ii) the new output after the intelligent cloud advisor engine received feedback to illustrate the changes to the outputs.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a server, opportunity data that describes an opportunity and unstructured supporting data that is in multiple different data formats that are not consumable by a set of trained interconnected classifiers, that has been collected from a plurality of different data sources, and that is for aiding the server in generating a plurality of data insights for improving a potential for winning the opportunity;
   obtaining, by the server, unstructured historical data from a data repository based on the received data that describes the opportunity;
   generating, by the server and based on the received, unstructured supporting data and the obtained, unstructured historical data, standardized feature vectors that are in a standardized data format that is consumable by the set of trained interconnected classifiers, wherein generating standardized feature vectors comprises:
      tokenizing the received, unstructured supporting data and the obtained, unstructured historical data to identify multiple tokens, and
      transforming the multiple tokens into the standardized feature vectors in an N-dimensional data set;
   filtering, by the server, the standardized feature vectors based at least on the opportunity data to obtain filtered standardized feature vectors with a reduced dimensionality, wherein filtering the standardized feature vectors comprises: for each feature vector included in the standardized feature vectors,
      comparing i) text corresponding to the feature vector with ii) text of the opportunity data,
      determining that the text of the feature vector is not included in the text of the opportunity data, and
      in response to determining that the text of the feature vector is not included in the text of the opportunity data, removing the feature vector, whose text was not included in the text of the opportunity data, from the standardized feature vectors;
   generating, by the server, a win percentage for the opportunity based on the filtered standardized feature vectors using a particular trained interconnected classifier of the set of trained interconnected classifiers;
   in response to generating the win percentage for the opportunity, generating, by the server and for each remaining trained interconnected classifier of the set of trained interconnected classifiers, a different data insight that is unique to the trained interconnected classifier; and
   providing, by the server, the win percentage and the plurality of data insights regarding the opportunity for output.

2. The method of claim 1, wherein receiving the data that describes the opportunity comprises:
   receiving, by the server, the data describing a sales pitch for the opportunity from the plurality of data sources, the plurality of data different sources storing at least one of: (i) web documents, (ii) emails, (iii) financial transactions, (iv) mobile communications, (v) digital documents, and (vi) client data associated with the opportunity.

3. The method of claim 2, wherein obtaining the unstructured historical data from the data repository comprises:
   identifying, by the server, the client data that the opportunity references; and
   retrieving, by the server, historical data using the identified client data from the data repository, wherein the data repository stores at least one of: (i) financial data associated with a plurality of clients, (ii) digital documents associated with the plurality of clients, and (iii) previous predictions generated by the server associated with the plurality of clients for other opportunities.

4. The method of claim 1, wherein filtering the standardized feature vectors further comprises:
   filtering, by the server, the multiple tokens based on a set of predefined categories, wherein filtering the multiple tokens (i) reduces a dimensionality of the N-dimensional data set and (i) associates the tokens from the multiple tokens with one or more of the categories from the set of predefined categories.

5. The method of claim 1, wherein generating the win percentage for the opportunity comprises:
   generating, by a win prediction classifier of the server, the win percentage for the opportunity based on the filtered standardized feature vectors and one or more machine learning algorithms that trained the win prediction classifier.

6. The method of claim 5, further comprising:
   generating, by a competition price range prediction classifier of the server, a competition price range that describes competitors prices for the opportunity based on the filtered, standardized feature vectors, the historical data, and one or more machine learning algorithms that trained the competition price range prediction classifier.

7. The method of claim 6, wherein generating, for each remaining trained interconnected classifier, a different data insight comprises:
   generating, by an intelligent action engine of the server, a plurality of actions to be taken by a client for pursuing the opportunity based on the generated win percentage and the generated competition price range;

generating, by an intelligent proposal response generator of the server, one or more options for inclusion in a proposal response associated with the opportunity to provide to a client;

generating, by an intelligent competition battlecard engine of the server, data representing a strategy for addressing strengths and weaknesses associated with the proposal response;

generating, by an intelligent business case engine of the server, data representing a business case for pursuing the opportunity, wherein the data representing the business case comprises (i) cost data, (ii) return on investment (ROI) data, (iii) investment data, and (iv) data for expansion of clientele business;

generating, by a dynamic weightage engine of the server, one or more weights associated with each category of data from the received data and the historical data; and generating, by a dynamic ranking engine of the server, ranked actions associated with the plurality of actions based on the generated one or more weights for the opportunity.

8. The method of claim 7, wherein providing the win percentage and the plurality of data insights regarding the opportunity for output comprises:

providing, by the server, the win percentage and the plurality of data insights regarding the opportunity for output to a client device associated with a user seeking to pursue the opportunity, wherein the plurality of data comprises the plurality of actions, the one or more options for inclusion in the proposal, the data representing the strategy for addressing the strengths and weaknesses associated with the proposal response, the data representing the business case, the one or more weights associated with each category of data, and the ranked actions.

9. The method of claim 1, further comprising:

receiving, by the server, feedback data that describes corrections to one or more data predictions for pursing the opportunity; and updating, by the server, the set of trained interconnected classifiers based on the received feedback data.

10. The method of claim 1, further comprising:

generating, by the server, a model that comprises the set of trained interconnected classifiers; and providing, by the server, the generated model for output as a web service.

11. A system comprising:

one or more computers and one or more storage devices storing instructions that are operable, when executed by the one or more computers, to cause the one or more computers to perform operations comprising:

receiving, by a server, opportunity data that describes an opportunity and unstructured supporting data that is in multiple different data formats that are not consumable by a set of trained interconnected classifiers, that has been collected from a plurality of different data sources, and that is for aiding the server in generating a plurality of data insights for improving a potential for winning the opportunity;

obtaining, by the server, unstructured historical data from a data repository based on the received data that describes the opportunity;

generating, by the server and based on the received, unstructured supporting data and the obtained, unstructured historical data, standardized feature vectors that are in a standardized data format that is consumable by the set of trained interconnected classifiers, wherein generating standardized feature vectors comprises:

tokenizing the received, unstructured supporting data and the obtained, unstructured historical data to identify multiple tokens, and transforming the multiple tokens into the standardized feature vectors in an N-dimensional data set;

filtering, by the server, the standardized feature vectors based at least on the opportunity data to obtain filtered standardized feature vectors with a reduced dimensionality, wherein filtering the standardized feature vectors comprises: for each feature vector included in the standardized feature vectors, comparing i) text corresponding to the feature vector with ii) text of the opportunity data, determining that the text of the feature vector is not included in the text of the opportunity data, and in response to determining that the text of the feature vector is not included in the text of the opportunity data, removing the feature vector, whose text was not included in the text of the opportunity data, from the standardized feature vectors;

generating, by the server, a win percentage for the opportunity based on the filtered standardized feature vectors using a particular trained interconnected classifier of the set of trained interconnected classifiers;

in response to generating the win percentage for the opportunity, generating, by the server and for each remaining trained interconnected classifier of the set of trained interconnected classifiers, a different data insight that is unique to the trained interconnected classifier; and providing, by the server, the win percentage and the plurality of data insights regarding the opportunity for output.

12. The system of claim 11, wherein receiving the data that describes the opportunity comprises:

receiving, by the server, the data describing a sales pitch for the opportunity from the plurality of data sources, the plurality of data different sources storing at least one of: (i) web documents, (ii) emails, (iii) financial transactions, (iv) mobile communications, (v) digital documents, and (vi) client data associated with the opportunity.

13. The system of claim 12, wherein obtaining the unstructured historical data from the data repository comprises:

identifying, by the server, the client data that the opportunity references; and retrieving, by the server, historical data using the identified client data from the data repository, wherein the data repository stores at least one of: (i) financial data associated with a plurality of clients, (ii) digital documents associated with the plurality of clients, and (iii) previous predictions generated by the server associated with the plurality of clients for other opportunities.

14. The system of claim 11, wherein filtering the standardized feature vectors further comprises:

filtering, by the server, the multiple tokens based on a set of predefined categories, wherein filtering the multiple tokens (i) reduces a dimensionality of the N-dimensional data set and (i) associates the tokens from the multiple tokens with one or more of the categories from the set of predefined categories.

15. The system of claim 11, wherein generating the win percentage for the opportunity comprises:
generating, by a win prediction classifier of the server, the win percentage for the opportunity based on the filtered standardized feature vectors and one or more machine learning algorithms that trained the win prediction classifier.

16. The system of claim 15, further comprising:
generating, by a competition price range prediction classifier of the server, a competition price range that describes competitors prices for the opportunity based on the filtered, standardized feature vectors, the historical data, and one or more machine learning algorithms that trained the competition price range prediction classifier.

17. The system of claim 16, wherein generating, for each remaining trained interconnected classifier, a different data insight comprises:
generating, by an intelligent action engine of the server, a plurality of actions to be taken by a client for pursuing the opportunity based on the generated win percentage and the generated competition price range;
generating, by an intelligent proposal response generator of the server, one or more options for inclusion in a proposal response associated with the opportunity to provide to a client;
generating, by an intelligent competition battlecard engine of the server, data representing a strategy for addressing strengths and weaknesses associated with the proposal response;
generating, by an intelligent business case engine of the server, data representing a business case for pursuing the opportunity, wherein the data representing the business case comprises (i) cost data, (ii) return on investment (ROI) data, (iii) investment data, and (iv) data for expansion of clientele business;
generating, by a dynamic weightage engine of the server, one or more weights associated with each category of data from the received data and the historical data; and
generating, by a dynamic ranking engine of the server, ranked actions associated with the plurality of actions based on the generated one or more weights for the opportunity.

18. A non-transitory computer-readable medium storing software comprising instructions executable by one or more computers which, upon such execution, cause the one or more computers to perform operations comprising:
receiving, by a server, opportunity data that describes an opportunity and unstructured supporting data that is in multiple different data formats that are not consumable by a set of trained interconnected classifiers, that has been collected from a plurality of different data sources, and that is for aiding the server in generating a plurality of data insights for improving a potential for winning the opportunity;
obtaining, by the server, unstructured historical data from a data repository based on the received data that describes the opportunity;
generating, by the server and based on the received, unstructured supporting data and the obtained, unstructured historical data, standardized feature vectors that are in a standardized data format that is consumable by the set of trained interconnected classifiers, wherein generating standardized feature vectors comprises:
tokenizing the received, unstructured supporting data and the obtained, unstructured historical data to identify multiple tokens, and
transforming the multiple tokens into the standardized feature vectors in an N-dimensional data set;
filtering, by the server, the standardized feature vectors based at least on the opportunity data to obtain filtered standardized feature vectors with a reduced dimensionality, wherein filtering the standardized feature vectors comprises: for each feature vector included in the standardized feature vectors,
comparing i) text corresponding to the feature vector with ii) text of the opportunity data,
determining that the text of the feature vector is not included in the text of the opportunity data, and
in response to determining that the text of the feature vector is not included in the text of the opportunity data, removing the feature vector, whose text was not included in the text of the opportunity data, from the standardized feature vectors;
generating, by the server, a win percentage for the opportunity based on the filtered standardized feature vectors using a particular trained interconnected classifier of the set of trained interconnected classifiers;
in response to generating the win percentage for the opportunity, generating, by the server and for each remaining trained interconnected classifier of the set of trained interconnected classifiers, a different data insight that is unique to the trained interconnected classifier; and
providing, by the server, the win percentage and the plurality of data insights regarding the opportunity for output.

* * * * *

UNITED STATES PATENT AND TRADEMARK OFFICE
CERTIFICATE OF CORRECTION

PATENT NO. : 11,789,983 B2
APPLICATION NO. : 17/472996
DATED : October 17, 2023
INVENTOR(S) : Kishore P. Durg et al.

It is certified that error appears in the above-identified patent and that said Letters Patent is hereby corrected as shown below:

In the Claims

In Claim 4, Column 32, Line 43, delete "(i)" and insert -- (ii) --.

In Claim 14, Column 34, Line 65, delete "(i)" and insert -- (ii) --.

Signed and Sealed this
Fifth Day of December, 2023

Katherine Kelly Vidal
*Director of the United States Patent and Trademark Office*